United States Patent
Smith et al.

(10) Patent No.: US 11,358,615 B2
(45) Date of Patent: Jun. 14, 2022

(54) SYSTEM AND METHOD FOR DETERMINING VEHICLE ORIENTATION IN A VEHICLE CONSIST

(71) Applicant: GE Global Sourcing LLC, Norwalk, CT (US)

(72) Inventors: Eugene Smith, Melbourne, FL (US); Mark Bradshaw Kraeling, Melbourne, FL (US); Michael Scott Miner, Melbourne, FL (US); Shannon Joseph Clouse, Erie, PA (US); Anwarul Azam, Lawrence Park, PA (US); Matthew Lawrence Blair, Lawrence Park, PA (US); Nidhi Naithani, Bangalore (IN); Dattaraj Jagdish Rao, Bangalore (IN); Anju Bind, Bangalore (IN); Sreyashi Dey Chaki, Bangalore (IN); Scott Daniel Nelson, Melbourne, FL (US); Nikhil Uday Naphade, Maharashtra (IN); Wing Yeung Chung, Erie, PA (US); Daniel Malachi Ballesty, Wattsburg, PA (US); Glenn Robert Shaffer, Erie, PA (US); Jeffrey James Kisak, Erie, PA (US); Dale Martin DiDomenico, Melbourne, FL (US); Shawn Arthur McClintic, Erie, PA (US); David Peltz, Norwalk, CT (US)

(73) Assignee: GE Global Sourcing LLC, Norwalk, CT (US)

(*) Notice: Subject to any disclaimer, the term of this patent is extended or adjusted under 35 U.S.C. 154(b) by 215 days.

(21) Appl. No.: 16/411,788

(22) Filed: May 14, 2019

(65) Prior Publication Data
US 2019/0263430 A1     Aug. 29, 2019

Related U.S. Application Data

(60) Continuation-in-part of application No. 15/421,978, filed on Feb. 1, 2017, now Pat. No. 10,338,580, which
(Continued)

(51) Int. Cl.
*B61C 17/12* (2006.01)
*B60L 15/32* (2006.01)
(Continued)

(52) U.S. Cl.
CPC .............. *B61C 17/12* (2013.01); *B60L 15/00* (2013.01); *B60L 15/32* (2013.01); *B60L 15/34* (2013.01);
(Continued)

(58) Field of Classification Search
CPC .......... B61C 17/12; B60L 15/00; B60L 15/32; B60L 15/34; B60L 15/38; B60L 2200/26;
(Continued)

(56) References Cited

U.S. PATENT DOCUMENTS

| | | | |
|---|---|---|---|
| 5,685,507 | A | 11/1997 | Horst et al. |
| 7,277,008 | B2 | 10/2007 | Froitzheim |

(Continued)

FOREIGN PATENT DOCUMENTS

| | | |
|---|---|---|
| CN | 1802678 A | 7/2006 |
| CN | 104112127 A | 10/2014 |

(Continued)

OTHER PUBLICATIONS

Search Report dated Dec. 7, 2020 for corresponding European Application No. 20173964.6 (11 pages).
(Continued)

*Primary Examiner* — Paula L Schneider
(74) *Attorney, Agent, or Firm* — The Small Patent Law Group LLC; Mary D. Lawlor

(57) ABSTRACT

A system and method includes determining, with a sensor assembly disposed onboard a first aerial vehicle, a direction in which a fluid flows within or through the first aerial vehicle, and determining an orientation of the first aerial vehicle relative to a second aerial vehicle based at least in part on the direction in which the fluid flows within or through the first aerial vehicle.

21 Claims, 5 Drawing Sheets

Related U.S. Application Data is a continuation-in-part of application No. 15/377,594, filed on Dec. 13, 2016, now Pat. No. 10,331,121, which is a continuation-in-part of application No. 14/520,585, filed on Oct. 22, 2014, now Pat. No. 9,550,484, and a continuation-in-part of application No. 14/616,795, filed on Feb. 9, 2015, now abandoned, and a continuation-in-part of application No. 14/836,063, filed on Aug. 26, 2015, now Pat. No. 10,464,579, which is a continuation-in-part of application No. 14/275,297, filed on May 12, 2014, now Pat. No. 9,180,892, which is a continuation of application No. 13/593,258, filed on Aug. 23, 2012, now Pat. No. 8,725,323, which is a continuation-in-part of application No. 11/552,602, filed on Oct. 25, 2006, now Pat. No. 8,280,566, said application No. 14/836,063 is a continuation-in-part of application No. 14/741,229, filed on Jun. 16, 2015, now abandoned, said application No. 15/377,594 is a continuation-in-part of application No. 14/803,089, filed on Jul. 19, 2015, now Pat. No. 9,656,680, which is a continuation of application No. 13/741,649, filed on Jan. 15, 2013, now Pat. No. 9,114,817, said application No. 15/377,594 is a continuation-in-part of application No. 15/238,501, filed on Aug. 16, 2016, now Pat. No. 9,917,773, which is a continuation of application No. 13/493,315, filed on Jun. 11, 2012, now abandoned, application No. 16/411,788, which is a continuation-in-part of application No. 16/263,870, filed on Jan. 31, 2019, now Pat. No. 11,008,029, which is a continuation-in-part of application No. 15/705,752, filed on Sep. 15, 2017, now Pat. No. 10,246,111, which is a continuation of application No. 15/061,212, filed on Mar. 4, 2016, now Pat. No. 9,764,748, application No. 16/411,788, which is a continuation-in-part of application No. 16/136,423, filed on Sep. 20, 2018, now Pat. No. 11,039,055, which is a division of application No. 14/541,370, filed on Nov. 14, 2014, now Pat. No. 10,110,795, which is a continuation-in-part of application No. 14/217,672, filed on Mar. 18, 2014, now Pat. No. 11,124,207, and a continuation-in-part of application No. 14/253,294, filed on Apr. 15, 2014, now Pat. No. 9,875,414, and a continuation-in-part of application No. 14/457,353, filed on Aug. 12, 2014, now abandoned, and a continuation-in-part of application No. 14/479,847, filed on Sep. 8, 2014, now abandoned, and a continuation-in-part of application No. 14/485,398, filed on Sep. 12, 2014, now Pat. No. 10,049,298, and a continuation-in-part of application No. 13/109,209, filed on May 17, 2011, now Pat. No. 8,913,131, which is a division of application No. 11/146,831, filed on Jun. 6, 2005, now Pat. No. 7,965,312, which is a continuation-in-part of application No. 10/361,968, filed on Feb. 10, 2003, now abandoned, said application No. 14/479,847 is a continuation-in-part of application No. 14/217,672, filed on Mar. 18, 2014, now Pat. No. 11,124,207, said application No. 16/379,976 is a continuation of application No. 16/114,318, filed on Aug. 28, 2018, now Pat. No. 10,300,601, which is a continuation-in-part of application No. 15/198,673, filed on Jun. 30, 2016, now Pat. No. 10,065,317, and a continuation-in-part of application No. 15/399,313, filed on Jan. 5, 2017, now Pat. No. 10,493,629, and a continuation-in-part of application No. 15/183,850, filed on Jun. 16, 2016, now Pat. No. 10,105,844, and a continuation-in-part of application No. 15/872,582, filed on Jan. 16, 2018, now Pat. No. 10,739,770, and a continuation-in-part of application No. 15/809,515, filed on Nov. 10, 2017, now abandoned, and a continuation-in-part of application No. 15/804,767, filed on Nov. 6, 2017, now Pat. No. 10,761,526, and a continuation-in-part of application No. 15/585,502, filed on May 3, 2017, now Pat. No. 10,521,960, and a continuation-in-part of application No. 15/587,950, filed on May 5, 2017, now Pat. No. 10,633,093, and a continuation-in-part of application No. 15/473,384, filed on Mar. 29, 2017, now Pat. No. 10,518,411, and a continuation-in-part of application No. 14/541,370, filed on Nov. 14, 2014, now Pat. No. 10,110,795, and a continuation-in-part of application No. 15/584,995, filed on May 2, 2017, now abandoned, and a continuation-in-part of application No. 15/473,345, filed on Mar. 29, 2017, now Pat. No. 10,618,168, and a continuation-in-part of application No. 15/058,494, filed on Mar. 2, 2016, now Pat. No. 10,093,022, application No. 16/411,788, which is a continuation-in-part of application No. 16/275,569, filed on Feb. 14, 2019, now Pat. No. 11,208,129, which is a continuation-in-part of application No. 16/195,950, filed on Nov. 20, 2018, now abandoned, which is a continuation of application No. 15/651,630, filed on Jul. 17, 2017, now abandoned, which is a continuation-in-part of application No. 14/624,069, filed on Feb. 17, 2015, now Pat. No. 9,873,442, and a continuation-in-part of application No. 15/044,592, filed on Feb. 16, 2016, now Pat. No. 10,308,265, said application No. 16/195,950 is a continuation-in-part of application No. 11/750,716, filed on May 18, 2007, now abandoned, and a continuation-in-part of application No. 11/385,354, filed on Mar. 20, 2006, now Pat. No. 9,733,625, said application No. 14/624,069 is a continuation-in-part of application No. 14/541,370, filed on Nov. 14, 2014, now Pat. No. 10,110,795, said application No. 15/044,592 is a continuation-in-part of application No. 14/922,787, filed on Oct. 26, 2015, now Pat. No. 10,569,792, which is a continuation-in-part of application No. 14/155,454, filed on Jan. 15, 2014, now Pat. No. 9,671,358, and a continuation-in-part of application No. 12/573,141, filed on Oct. 4, 2009, now Pat. No. 9,233,696, which is a continuation-in-part of application No. 11/385,354, filed on Mar. 20, 2006, now Pat. No. 9,733,625, said application No. 14/155,454 is a continuation of application No. PCT/US2013/054284, filed on Aug. 9, 2013, said application No. 16/275,569 is a continuation-in-part of application No. 15/831,549, filed on Dec. 5, 2017, now Pat. No. 10,752,269, and a continuation-in-part of application No. 15/218,529, filed on Jul. 25, 2016, now Pat. No. 10,678,734, and a continuation-in-part of application No. 14/922,787, filed on Oct. 26, 2015, now Pat. No. 10,569,792, and a continuation-in-part of application No. 14/152,159, filed on Jan. 10, 2014, now Pat. No. 9,205,849, which is a continuation-in-part of application No. 13/478,388, filed on May 23, 2012, now abandoned, said application No. 16/275,569 is a continuation-in-part of application No. 15/044,592, filed on Feb. 16, 2016, now Pat. No. 10,308,265, which is a continuation-in-part of application No. 14/922,787, filed on Oct. 26, 2015, now Pat. No. 10,569,792, which is a continuation-in-part of application No. 14/155,454, filed on Jan. 15, 2014, now Pat. No. 9,671,358, which is a continuation of application No. PCT/US2013/054284, filed on Aug. 9, 2013, said application No. 14/922,787 is a continuation-in-part of application No. 12/573,141, filed on Oct. 4, 2009, now Pat. No. 9,233,696, which is a continuation-in-part of application No. 11/385,354, filed on Mar. 20, 2006, now Pat. No. 9,733,625, said application No. 14/922,787 is a continuation-in-part of application No. 14/152,159, filed on Jan. 10, 2014, now Pat. No. 9,205,849, which is a continuation-in-part of application No. 13/478,388, filed on May 23, 2012, now abandoned, application No. 16/411,788, which is a continuation-in-part of application No. 15/061,129, filed on Mar. 4, 2016.

(60) Provisional application No. 62/469,368, filed on Mar. 9, 2017, provisional application No. 62/403,963, filed on Oct. 4, 2016, provisional application No. 62/343,615, filed on May 31, 2016, provisional application No. 62/336,332, filed on May 13, 2016, provisional application No. 62/281,429, filed on Jan. 21, 2016, provisional application No. 62/269,481, filed on Dec. 18, 2015, provisional application No. 62/269,425, filed on Dec. 18, 2015, provisional application No. 62/269,377, filed on Dec. 18, 2015, provisional application No. 62/269,523, filed on Dec. 18, 2015, provisional application No. 62/134,518, filed on Mar. 17, 2015, provisional application No. 62/049,524, filed on Sep. 12, 2014, provisional application No. 61/940,696, filed on Feb. 17, 2014, provisional application No. 61/940,660, filed on Feb. 17, 2014, provisional application No. 61/940,813, filed on Feb. 17, 2014, provisional application No. 61/940,610, filed on Feb. 17, 2014, provisional application No. 61/860,496, filed on Jul. 31, 2013, provisional application No. 61/729,188, filed on Nov. 21, 2012, provisional application No. 61/681,843, filed on Aug. 10, 2012, provisional application No. 60/894,006, filed on Mar. 9, 2007, provisional application No. 60/792,428, filed on Apr. 17, 2006, provisional application No. 60/626,573, filed on Nov. 10, 2004, provisional application No. 60/385,645, filed on Jun. 4, 2002.

(51) Int. Cl.
*B60L 15/34* (2006.01)
*B60T 13/66* (2006.01)
*B60L 15/38* (2006.01)
*B60L 15/00* (2006.01)
*B60T 17/22* (2006.01)

(52) U.S. Cl.
CPC ............ *B60L 15/38* (2013.01); *B60T 13/665* (2013.01); *B60T 17/228* (2013.01); *B60L 2200/26* (2013.01); *Y02T 10/72* (2013.01); *Y02T 90/16* (2013.01)

(58) Field of Classification Search
CPC ...... B60T 13/665; B60T 17/228; Y02T 10/72; Y02T 90/16; B61L 15/0072
USPC ............................................. 246/167, 167 R
See application file for complete search history.

(56) References Cited

U.S. PATENT DOCUMENTS

| | | | |
|---|---|---|---|
| 7,493,202 B2 | 2/2009 | Demro et al. | |
| 7,965,312 B2 | 6/2011 | Chung et al. | |
| 7,983,805 B2 | 7/2011 | Bryant | |
| 8,522,690 B2 | 9/2013 | Smith et al. | |
| 10,876,920 B1* | 12/2020 | McFarland | G01M 9/065 |
| 2004/0010432 A1 | 1/2004 | Matheson et al. | |
| 2006/0074544 A1 | 4/2006 | Morariu et al. | |
| 2007/0005202 A1 | 1/2007 | Breed | |
| 2007/0027583 A1 | 2/2007 | Tamir | |
| 2007/0241237 A1 | 10/2007 | Foy et al. | |
| 2008/0128563 A1 | 6/2008 | Kumar et al. | |
| 2010/0274444 A1* | 10/2010 | Williamson | B64D 39/00 701/29.8 |
| 2011/0216200 A1 | 9/2011 | Chung | |
| 2014/0151512 A1 | 6/2014 | Cooper et al. | |

FOREIGN PATENT DOCUMENTS

| | | | |
|---|---|---|---|
| EP | 0953491 A1 | 3/1999 | |
| JP | 2008247154 A | 10/2008 | |
| SU | 498189 | 1/1976 | |
| WO | 2005120925 A2 | 12/2005 | |
| WO | 2007084140 A1 | 7/2007 | |
| WO | 2007111768 A2 | 10/2007 | |
| WO | 2012150591 A2 | 11/2012 | |
| WO | 2014004003 A2 | 1/2014 | |

OTHER PUBLICATIONS

Examination report No. 4 for AU application 2015217470 dated Apr. 18, 2018 (4 pages).
Examination report No. 1 for AU application 2018202825 dated Aug. 15, 2019 (5 pages).
First Examination Report for corresponding AU Application No. 2015217535 dated Jun. 5, 2019 (3 pages).
Office Action for corresponding U.S. Appl. No. 13/956,426 dated May 17, 2017 (10 pages).
Notice of Allowance for corresponding U.S. Appl. No. 13/844,471 dated May 8, 2017 (10 pages).
Second Examination Report for corresponding AU Application No. 2018200951 dated May 31, 2019 (4 pages).
Examination Report dated Sep. 29, 2020 for corresponding Australian patent application No. 2019280015.
First Office Action issued in connection with corresponding CN Application No. 201580020135.7 dated Jan. 29, 2019.
Final Office Action dated Dec. 17, 2019 for Japanese Application No. 2015-173383.
Examination Report dated Feb. 11, 2020 for Australian Application No. 2018202825.
Fourth Examination Report dated Apr. 17, 2020 for corresponding Australian patent application No. 2018202825 (4 pages).
Second Examination Report dated Nov. 1, 2019 for corresponding AU Application No. 2018202825.
Office Action dated Nov. 3, 2020 for corresponding Chinese Patent Application No. 2019108511987 (7 pages).
English translation of the Office Action dated Nov. 3, 2020 for corresponding Chinese Patent Application No. 2019108511987 (5 pages).

(56) References Cited

OTHER PUBLICATIONS

Examination Report dated Nov. 5, 2020 for corresponding Australian Patent Application No. 2019205977 (5 pages).
Examination report for AU 2018200951, dated Oct. 17, 2019, 3 pages.
First Examination Report dated Mar. 16, 2021 for corresponding Indian patent application No. 5505/CHE/2015 (5 pages).
Second Examination Report dated Sep. 9, 2019 for corresponding AU Application No. 2015217535.
Office Action dated Sep. 9, 2019 for corresponding JP Application No. 2015-173383.
English Translation of the Office Action dated Sep. 9, 2019 for corresponding JP Application No. 2015-173383.
Fifth Examination Report dated Jul. 13, 2020 for corresponding Australian patent application No. 2018202825.
First Examination Report for corresponding AU Application No. 2021202262 dated Dec. 16, 2021 (3 pages).

* cited by examiner

SYSTEM AND METHOD FOR DETERMINING VEHICLE ORIENTATION IN A VEHICLE CONSIST

CROSS-REFERENCE TO RELATED APPLICATIONS

This application is a continuation-in-part of U.S. patent application Ser. No. 15/421,978 entitled SYSTEM AND METHOD FOR DETERMINING VEHICLE ORIENTATION IN A VEHICLE CONSIST which was filed on 1 Feb. 2017, which is a continuation-in-part of U.S. patent application Ser. No. 15/377,594 which was filed on 13 Dec. 2016, which is a continuation-in-part of U.S. patent application Ser. No. 14/520,585, which was filed on 22 Oct. 2014.

This application is also a continuation-in-part of U.S. patent application Ser. No. 15/377,594 entitled VEHICLE COMMUNICATION SYSTEM which was filed on Dec. 13, 2016, which is a continuation-in-part of U.S. patent application Ser. No. 14/616,795, filed on 9 Feb. 2015 (the "'795 Application").

The '594 application is a continuation-in-part of U.S. patent application Ser. No. 14/836,063, filed on 26 Aug. 2015 (the "'063 Application"), which is a continuation-in-part of U.S. patent application Ser. No. 14/275,297, filed on 12 May 2014 (the "297 Application") which issued as U.S. Pat. No. 9,180,892 on 10 Nov. 2015, which is a continuation of U.S. patent application Ser. No. 13/593,258, filed on 23 Aug. 2012 (the "'258 Application"). The '258 Application issued as U.S. Pat. No. 8,725,323 on 13 May 2014. The '258 Application is a continuation-in-part of U.S. patent application Ser. No. 11/552,602, filed on 25 Oct. 2006 (the "'602 Application"), which issued as U.S. Pat. No. 8,280,566 on 2 Oct. 2012. The '602 Application claims priority to U.S. Provisional Application No. 60/792,428, filed on 17 Apr. 2006 (the "'428 Application"). The '063 Application also is a continuation-in-part of U.S. patent application Ser. No. 14/741,229, filed 16 Jun. 2015 (the "'229 Application), which claims priority to U.S. Provisional Application No. 62/049,524, which filed on 12 Sep. 2014 (the "'524 Application").

The '594 application is also a continuation-in-part of U.S. patent application Ser. No. 14/803,089, filed on 19 Jul. 2015 (the "'089 Application") which issued as U.S. Pat. No. 9,656,680 on 23 May 2017, which is a continuation of U.S. patent application Ser. No. 13/741,649, filed on 15 Jan. 2013 (the "'649 Application"), which issued as U.S. Pat. No. 9,114,817 on 25 Aug. 2015.

The '594 application is also a continuation-in-part of U.S. patent application Ser. No. 14/520,585, filed on 22 Oct. 2014 (the "'585 Application") which issued as U.S. Pat. No. 9,550,484 on 28 Apr. 2016.

The '594 application is also a continuation-in-part of U.S. patent application Ser. No. 15/238,501, filed on 16 Aug. 2016 (the "'501 Application") which issued as U.S. Pat. No. 9,917,773 on 8 Dec. 2016, which is a continuation of U.S. patent application Ser. No. 13/493,315, filed on 11 Jun. 2012 (the "'315 Application"), which claims priority to U.S. Provisional Application No. 61/495,878, filed on 10 Jun. 20111 (the "'878 Application").

This application is also a continuation-in-part of U.S. patent application Ser. No. 15/819,877 entitled AERIAL CAMERA SYSTEM, METHOD FOR IDENTIFYING ROUTE-RELATED HAZARDS AND MICROSTRIP ANTENNA which was filed on 21 Nov. 2017, which claims priority to U.S. Provisional Application No. 62/425,043 filed 21 Nov. 2016, and is a continuation-in-part of U.S. application Ser. No. 14/624,069, filed 17 Feb. 2015, and issued as U.S. Pat. No. 9,873,442 on 23 Jan. 2018.

The '069 application claims priority to U.S. Provisional Application Nos. 61/940,813; 61/940,660; 61/940,610; and 61/940,696, all of which were filed on 17 Feb. 2014. U.S. application Ser. No. 14/624,069 also is a continuation-in-part of U.S. patent application Ser. No. 14/541,370, which was filed on 14 Nov. 2014 and issued as U.S. Pat. No. 10,110,795 on 23 Oct. 2018, and which claims priority to U.S. Provisional Application No. 61/940,813 filed on 17 Feb. 2014. U.S. patent application Ser. No. 14/541,370 is a continuation-in-part of U.S. patent application Ser. No. 14/217,672, which was filed on 18 Mar. 2014; U.S. patent application Ser. No. 14/253,294, which was filed on 15 Apr. 2014 and issued as U.S. Pat. No. 9,875,414 on 23 Jan. 2018; U.S. patent application Ser. No. 14/457,353, which was filed on 12 Aug. 2014; U.S. patent application Ser. No. 14/479,847, which was filed on 8 Sep. 2014; and U.S. patent application Ser. No. 14/485,398, which was filed on 12 Sep. 2014 and issued as U.S. Pat. No. 10,049,298 on 14 Aug. 2018.

This application is also a continuation-in-part of U.S. patent application Ser. No. 16/046,493, entitled REMOTE VEHICLE OPERATOR ASSIGNMENT SYSTEM which was filed on 26 Jul. 2018. U.S. patent application Ser. No. 16/046,493 is a continuation-in-part of U.S. patent application Ser. No. 15/460,431, which was filed on 16 Mar. 2017, and which claims priority to U.S. Provisional Application No. 62/327,101, which was filed on 25 Apr. 2016. This application also is a continuation-in-part of U.S. patent application Ser. No. 15/402,797, which was filed on 10 Jan. 2017.

This application is also a continuation-in-part of U.S. patent application Ser. No. 16/263,870 entitled VEHICLE CONTROL SYSTEM which was filed on 31 Jan. 2019, which is a continuation-in-part of U.S. patent application Ser. No. 15/705,752, filed 15 Sep. 2017 and issued as U.S. Pat. No. 10,246,111 on 2 Apr. 2019. U.S. patent application Ser. No. 15/705,752 is a continuation of U.S. patent application Ser. No. 15/061,212, filed 4 Mar. 2016 and issued as U.S. Pat. No. 9,764,748 on Sep. 19, 2017. U.S. patent application Ser. No. 15/061,212 claims priority to U.S. Provisional Application No. 62/281,429, filed Jan. 21, 2016.

This application is also a continuation-in-part of U.S. patent application Ser. No. 16/136,423, entitled VIDEO SYSTEM AND METHOD FOR DATA COMMUNICATION which was filed on 20 Sep. 2018. U.S. patent application Ser. No. 16/136,423 is a divisional of U.S. application Ser. No. 14/541,370 filed 14 Nov. 2014, which issued as U.S. Pat. No. 10,110,795 on 23 Oct. 2018.

The '370 application claims priority to U.S. Provisional Application Nos. 61/940,813; 61/940,660; 61/940,610; and 61/940,696, all of which were filed on 17 Feb. 2014.

The '370 application also is a continuation-in-part of U.S. patent application Ser. No. 14/217,672, which was filed on 18 Mar. 2014 (the "'672 Application"); U.S. patent application Ser. No. 14/253,294, which was filed on 15 Apr. 2014 and issued as U.S. Pat. No. 9,875,414 on 23 Jan. 2018; U.S. patent application Ser. No. 14/457,353, which was filed on 12 Aug. 2014; U.S. patent application Ser. No. 14/479,847, which was filed on 8 Sep. 2014; U.S. patent application Ser. No. 14/485,398, which was filed on 12 Sep. 2014 and issued as U.S. Pat. No. 10,049,298 on 14 Aug. 2018; and U.S. patent application Ser. No. 13/109,209, which was filed on 17 May 2011 and issued as U.S. Pat. No. 8,913,131 on 16 Dec. 2014. The '209 Application is a divisional application of U.S. patent application Ser. No. 11/146,831, which was filed on 6 Jun. 2005 and is now U.S. Pat. No. 7,965,312, which claims priority to U.S. Provisional Application No. 60/626,573, which was filed on 10 Nov. 2004. The '831 Application also is a continuation-in-part of U.S. patent application Ser. No. 10/361,968, which was filed on 10 Feb. 2003, and which claims priority to U.S. Provisional Application No. 60/385,645, which was filed on 4 Jun. 2002. The '847 Application is a continuation-in-part of the '672 Application.

The '353 Application and the '398 Application each claim priority to U.S. Provisional Application Nos. 61/940,813; 61/940,660; 61/940,610; and 61/940,696.

This application is also a continuation-in-part of U.S. patent application Ser. No. 16/379,976 entitled CONTROL SYSTEM WITH TASK MANAGER which was filed on 10 Apr. 2019. The '976 application is a continuation of U.S. application Ser. No. 16/114,318, which was filed on 28 Aug. 2018. The '318 Application is a continuation-in-part of patented U.S. application Ser. No. 15/198,673, filed on 30 Jun. 2016 and issued as U.S. Pat. No. 10,065,317 on 4 Sep. 2018; and is a continuation-in-part of pending U.S. application Ser. No. 15/399,313, filed on 5 Jan. 2017; and is a continuation-in-part of patented U.S. application Ser. No. 15/183,850, filed on 16 Jun. 2016 and published as U.S. Pat. No. 10,105,844 on 23 Oct. 2018; and is a continuation-in-part of pending U.S. application Ser. No. 15/872,582, filed on 16 Jan. 2018; and is a continuation-in-part of pending U.S. application Ser. No. 15/809,515, filed on 10 Nov. 2017; and is a continuation-in-part of pending U.S. application Ser. No. 15/804,767, filed on 6 Nov. 2017; and is a continuation-in-part of pending U.S. application Ser. No. 15/585,502, filed on 3 May 2017; and is a continuation-in-part of pending U.S. application Ser. No. 15/587,950, filed on 5 May 2017; and is a continuation-in-part of pending U.S. application Ser. No. 15/473,384, filed on 29 Mar. 2017; and is a continuation-in-part of patented U.S. application Ser. No. 14/541,370, filed on 14 Nov. 2014 and issued as U.S. Pat. No. 10,110,795 on 23 Oct. 2018; and is a continuation-in-part of pending U.S. application Ser. No. 15/584,995, filed on 2 May 2017; and is a continuation-in-part of pending U.S. application Ser. No. 15/473,345, filed on 29 Mar. 2017, which claims priority to U.S. Provisional Application No. 62/343,615, filed on 31 May 2016 and to U.S. Provisional Application No. 62/336,332, filed on 13 May 2016.

The '318 application is also a continuation-in-part of U.S. application Ser. No. 15/058,494 filed on 2 Mar. 2016 and issued as U.S. Pat. No. 10,093,022 on 9 Oct. 2018, which claims priority to U.S. Provisional Application Nos. 62/269,523, 62/269,425, 62/269,377, and 62/269,481, all of which were filed on 18 Dec. 2015.

This application is also a continuation-in-part of U.S. patent application Ser. No. 16/275,569 entitled LOCOMOTIVE CONTROL SYSTEM AND METHOD which was filed on 14 Feb. 2019. The '569 Application is a continuation-in-part of U.S. patent application Ser. No. 16/195,950 ("the '950 Application"), filed on 20 Nov. 2018, which is a continuation of U.S. patent application Ser. No. 15/651,630 ("the '630 Application") filed on 17 Jul. 2017, which claims priority to U.S. Provisional Application No. 62/403,963, filed 4 Oct. 2016. The '630 Application is a continuation-in-part of U.S. patent application Ser. No. 14/624,069 ("the '069 Application"), filed 17 Feb. 2015 and issued as U.S. Pat. No. 9,873,442 on 23 Jan. 2018, and is a continuation-in-part of U.S. patent application Ser. No. 15/044,592 ("the '592 Application"), filed 16 Feb. 2016.

The '950 Application is also a continuation-in-part of U.S. patent application Ser. No. 11/750,716 filed 18 May 2007, which claims priority to U.S. Provisional Application No. 60/894,006, filed 9 Mar. 2007, and is also a continuation-in-part of U.S. application Ser. No. 11/385,354, filed 20 Mar. 2006 and issued as U.S. Pat. No. 9,733,625 on 15 Aug. 2017.

The '069 Application claims priority to U.S. Provisional Application Nos. 61/940,813; 61/940,660; 61/940,610; and 61/940,696, all of which were filed on 17 Feb. 2014.

The '069 Application also is a continuation-in-part of U.S. patent application Ser. No. 14/541,370 ("the '370 Application"), filed on 14 Nov. 2014 and issued as U.S. Pat. No. 10,110,795 on 23 Oct. 2018, which claims priority to U.S. Provisional Application No. 61/940,813, filed on 17 Feb. 2014. The '370 Application is a continuation-in-part of U.S. patent application Ser. No. 14/217,672, filed 18 Mar. 2014, U.S. patent application Ser. No. 14/253,294, filed on 15 Apr. 2014 and issued as U.S. Pat. No. 9,875,414 on 23 Jan. 2018, U.S. patent application Ser. No. 14/457,353, filed 12 Aug. 2014, U.S. patent application Ser. No. 14/479,847, filed 8 Sep. 2014, U.S. patent application Ser. No. 14/485,398, filed 12 Sep. 2014 and issued as U.S. Pat. No. 10,049,298 on 14 Aug. 2018, and U.S. patent application Ser. No. 13/109,209 ("the '209 Application"), filed 17 May 2011 and issued as U.S. Pat. No. 8,913,131 on 16 Dec. 2014.

The '209 Application is a divisional application of U.S. patent application Ser. No. 11/146,831, filed 6 Jun. 2005 and issued as U.S. Pat. No. 7,965,312 on 21 Jun. 2011, which claims priority to U.S. Provisional Application No. 60/626,573, filed 10 Nov. 2004, and is a continuation-in-part of U.S. patent application Ser. No. 10/361,968, filed 10 Feb. 2003, which is now abandoned and which claims priority to U.S. Provisional Application No. 60/385,645, filed 4 Jun. 2002.

The '592 Application claims priority to U.S. Provisional Application No. 62/134,518, filed 17 Mar. 2015, and is a continuation-in-part of U.S. application Ser. No. 14/922,787 ("the '787 Application"), filed 26 Oct. 2015, which claims priority to U.S. Provisional Application No. 62/134,518. The '787 Application also is a continuation-in-part of U.S. application Ser. No. 14/155,454 ("the '454 Application"), filed 15 Jan. 2014 and issued as U.S. Pat. No. 9,671,358 on 6 Jun. 2017, and is a continuation-in-part of U.S. application Ser. No. 12/573,141 ("the '141 Application"), filed 4 Oct. 2009 and issued as U.S. Pat. No. 9,233,696 on 12 Jan. 2016.

The '787 Application also is a continuation-in-part of U.S. application Ser. No. 14/155,454 ("the '454 Application"), filed 15 Jan. 2014 and issued as U.S. Pat. No. 9,671,358 on 6 Jun. 2017, and is a continuation-in-part of U.S. application Ser. No. 12/573,141 ("the '141 Application"), filed 4 Oct. 2009 and issued as U.S. Pat. No. 9,233,696 on 12 Jan. 2016. The '141 Application is a continuation-in-part of U.S. application Ser. No. 11/385,354, filed 20 Mar. 2006 and issued as U.S. Pat. No. 9,733,625 on 15 Aug. 2017.

The '454 Application is a continuation of International Application No. PCT/US13/54284, filed 9 Aug. 2013, which claims priority to U.S. Provisional Application No. 61/681,843, filed 10 Aug. 2012, to U.S. Provisional Application No. 61/729,188, filed 21 Nov. 2012, to U.S. Provisional Application No. 61/860,469, filed 31 Jul. 2013, and to U.S. Provisional Application No. 61/860,496, filed 31 Jul. 2013.

The '569 application is also a continuation-in-part of U.S. patent application Ser. No. 15/831,549, filed on 5 Dec. 2017, which claims priority to U.S. Provisional Application No. 62/469,368, which was filed on 9 Mar. 2017.

The '569 application is also a continuation-in-part of U.S. patent application Ser. No. 15/218,529, filed on 25 Jul. 2016.

The '569 application is also a continuation-in-part of the '787 Application, filed on 26 Oct. 2015, which claims priority to U.S. Provisional Application No. 62/134,518, which was filed on 17 Mar. 2015. The '787 Application is also a continuation-in-part of the '454 Application, filed 15 Jan. 2014 (the "'454 Application"). The '454 Application is a continuation of International Application No. PCT/US13/54284, which was filed on 9 Aug. 2013, and claims priority to U.S.

Provisional Application No. 61/681,843, which was filed on 10 Aug. 2012, to U.S. Provisional Application No. 61/729,188, which was filed on 21 Nov. 2012, to U.S. Provisional Application No. 61/860,469, which was filed on 31 Jul. 2013, and to U.S. Provisional Application No. 61/860,496, which was filed on 31 Jul. 2013. The '787 Application is also a continuation-in-part of U.S. application Ser. No. 12/573,141, filed on Oct. 4, 2009 and issued as U.S. Pat. No. 9,233,696 on 12 Jan. 2016, which is a continuation-in-part of U.S. application Ser. No. 11/385,354, which was filed on 20 Mar. 2006 and issued as U.S. Pat. No. 9,733,625 on 15 Aug. 2017. The '787 Application is also a continuation-in-part of U.S. application Ser. No. 14/152,159, filed on 15 Jan. 2014 and issued as U.S. Pat. No. 9,205,849 on 8 Dec. 2015, which is a continuation-in-part of U.S. application Ser. No. 13/478,388, which was filed on 23 May 2012.

The '569 application is also a continuation-in-part of the '592 Application, which claims priority to U.S. Provisional Application No. 62/134,518, which was filed on 17 Mar. 2015. The '592 Application is also a continuation-in-part of the '787 Application, filed 26 Oct. 2015, which claims priority to U.S. Provisional Application No. 62/134,518. The '787 Application is also a continuation-in-part of the '454 Application, filed 15 Jan. 2014. The '454 Application is a continuation of International Application No. PCT/US13/54284, which was filed on 9 Aug. 2013, and claims priority to U.S. Provisional Application No. 61/681,843, which was filed on 10 Aug. 2012, to U.S. Provisional Application No. 61/729,188, which was filed on 21 Nov. 2012, to U.S. Provisional Application No. 61/860,469, which was filed on 31 Jul. 2013, and to U.S. Provisional Application No. 61/860,496, which was filed on 31 Jul. 2013. The '787 Application is also a continuation-in-part of U.S. application Ser. No. 12/573,141, filed on Oct. 4, 2009, which is a continuation-in-part of U.S. application Ser. No. 11/385,354, which was filed on 20 Mar. 2006. The '787 Application is also a continuation-in-part of U.S. application Ser. No. 14/152,159, filed on 15 Jan. 2014, which is a continuation-in-part of U.S. application Ser. No. 13/478,388, which was filed on 23 May 2012.

This application is also a continuation-in-part of U.S. patent application Ser. No. 15/061,129 entitled AERIAL CAMERA SYSTEM AND METHOD FOR IDENTIFYING ROUTE-RELATED HAZARDS which was filed 4 Mar. 2016.

The entire disclosures of each of these applications is incorporated herein by reference.

FIELD

Embodiments of the inventive subject matter described herein relate to vehicle consists.

BACKGROUND

Some known vehicle consists include several vehicles that generate tractive effort for propelling the vehicle consists along a route. For example, trains may have several locomotives coupled with each other that propel the train along a track. The locomotives may communicate with each other in order to coordinate the tractive efforts and/or braking efforts provided by the locomotives. As one example, locomotives may be provided in a distributed power (DP) arrangement with one locomotive designated as a lead locomotive and other locomotives designated as remote locomotives. The lead locomotive may direct the tractive and braking efforts provided by the remote locomotives during a trip of the consist.

Some known consists use wireless communication between the locomotives for coordinating the tractive and/or braking efforts. For example, a lead locomotive can issue commands to the remote locomotives. The remote locomotives receive the commands and implement the tractive efforts and/or braking efforts directed by the commands. In order to ensure that the remote locomotives receive the commands, the lead locomotive may periodically re-communicate the commands until all of the remote locomotives confirm receipt of the commands by communicating a confirmation message to the lead locomotive.

In order to set up the consists to wirelessly communicate in this manner, an operator typically travels to and boards each individual remote locomotive in turn. While onboard each remote locomotive, the operator enters an orientation of the remote locomotive relative to the lead locomotive. This orientation is used to ensure that commands received at the remote locomotive from the lead locomotive are correctly interpreted. For example, if the lead and remote locomotives are facing the same (e.g., common) direction, then a command to move forward at a designated throttle setting may be implemented by the remote locomotive rotating wheels of the remote locomotive in the same direction as the lead locomotive. But, if the lead and remote locomotives are facing opposite directions, then the command to move forward may not be implemented by the remote locomotive moving the wheels of the remote locomotive in the same direction as the lead locomotive. Instead, the remote locomotive may need to rotate the wheels of the remote locomotive in the opposite direction to move the consist forward.

The orientations of the remote locomotives relative to the lead locomotives may be needed for correct operation of the consist. Using manual entry of the orientations, however, is time consuming and prone to human error. Entering an incorrect orientation can cause damage to the consists, such as when the incorrect orientation of a remote locomotive results in the lead and remote locomotives attempting to move in opposite directions. This can cause unsafe compression or stretching of the portion of the consist between the lead and remote locomotives.

BRIEF DESCRIPTION

In one embodiment, a method (e.g., for determining an orientation of a vehicle) includes determining (with a sensor assembly disposed onboard a first vehicle) a direction in which a fluid flows within the first vehicle that is included in a vehicle consist with a second vehicle, and determining an orientation of the first vehicle relative to the second vehicle based at least in part on the direction in which the fluid flows within the first vehicle.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

In another embodiment, another method includes determining, with a sensor assembly disposed onboard a first aerial, a direction in which a fluid flows within or through the first aerial vehicle, and determining an orientation of the first aerial vehicle relative to a second aerial vehicle based at least in part on the direction in which the fluid flows within or through the first aerial vehicle.

In another embodiment, another system includes a sensor assembly that generates an output representative of a direction in which a fluid flows within a first aerial vehicle that is included in a vehicle consist with a second aerial vehicle. One or more processors determine an orientation of the first aerial vehicle relative to the second aerial vehicle based at least in part on the output generated by the sensor assembly.

In another embodiment, another method includes identifying a direction of air flow in a propulsion system of a first aerial vehicle of a vehicle consist having the first aerial vehicle and a second aerial vehicle, and determining an orientation of the first aerial vehicle relative to the second aerial vehicle in the vehicle consist based at least in part on the direction of the air flow in the propulsion system of the first aerial vehicle. The air is one or more of environmental air that is directed into the propulsion system of the first aerial vehicle or exhaust air that is directed out of the propulsion system of the first aerial vehicle.

BRIEF DESCRIPTION OF THE DRAWINGS

Reference is now made briefly to the accompanying drawings, in which.

DETAILED DESCRIPTION

Figure 1:
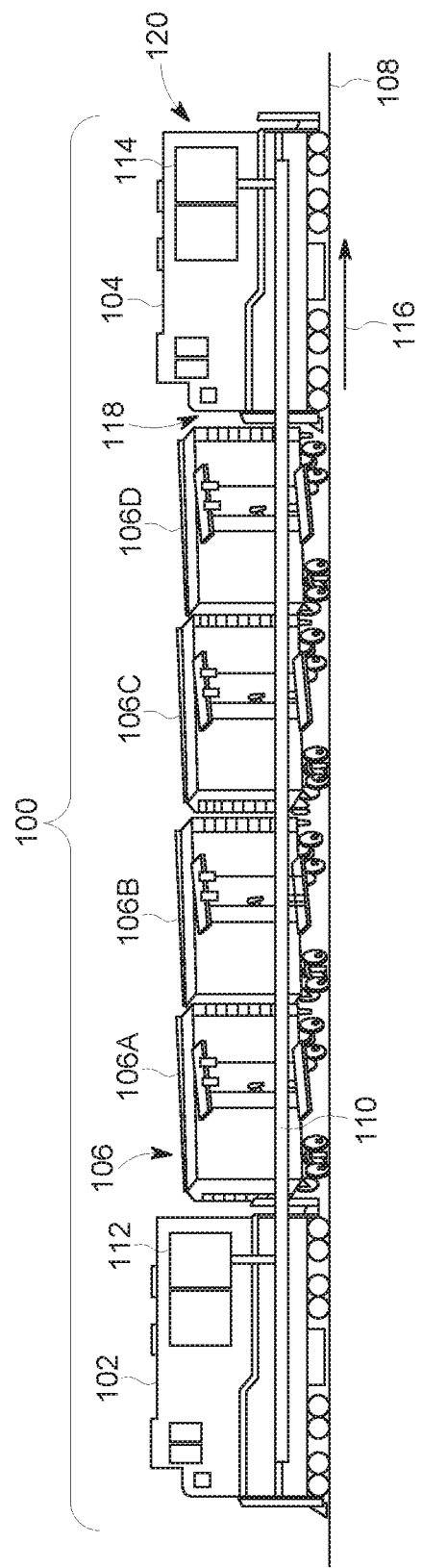
FIG. 1 is a schematic view of one embodiment of a vehicle consist.

One or more embodiments of the inventive subject matter described herein provide methods and systems for determining orientations of vehicles in a vehicle system having two or more vehicles. The vehicle system can include a vehicle consist with two or more propulsion-generating vehicles mechanically coupled with each other to travel together along a route. At least one of the propulsion-generating vehicles can remotely control operations of one or more other propulsion-generating vehicles in the vehicle consist. For example, the vehicle consist can include a rail vehicle consist having two or more locomotives mechanically coupled with each other by one or more other locomotives, rail cars, or the like. Optionally, other types of vehicles can be included in the consists, such as marine vessels, off-highway vehicles other than rail vehicles (e.g., mining vehicles or other vehicles that are not designed or legally permitted to travel on public roadways), —road vehicles such as automobiles or semi-trailer trucks (e.g., two or more semi-trailer trucks or automobiles communicatively linked to travel along a route, with one of the semi-trailer trucks or automobiles controlling the others), aerial drones (e.g., two or more aerial drones communicatively linked for coordinated travel relative to a route; one of the aerial drones may control the other(s), or they may be controlled separately but in coordination) or other aerial vehicles, or the like. An aerial drone is an aerial vehicle that is unmanned and controlled either remotely or automatically by an on-board computer system.

In setting up the vehicles in the vehicle consist to allow for at least one vehicle (e.g., a lead vehicle) to remotely control operations of one or more other vehicles in the vehicle consist (e.g., remote vehicles), the orientation of the remote vehicles relative to the lead vehicle may be determined so that commands send from the lead vehicle to the remote vehicle are correctly implemented. For example, the orientation of a remote vehicle may be input into a control unit of the remote vehicle and/or a lead vehicle so that, when a command signal is received from the lead vehicle or communicated from the lead vehicle, the command signal is interpreted by the remote vehicle to cause the remote vehicle to act to move in the same direction as the lead vehicle. If the lead and remote vehicle are facing the same direction (e.g., facing a common direction), then the command signal may be interpreted by the remote vehicle to cause a propulsion system of the remote vehicle to attempt to move in the same direction as the lead vehicle. With respect to vehicles having wheels, this may involve the remote vehicle rotating wheels of the remote vehicle in the same rotational direction (e.g., clockwise or counter-clockwise) as the lead vehicle. But, if the lead and remote vehicles are facing opposite directions, then the command signal may be interpreted differently to cause the propulsion system of the remote vehicle to attempt to move in the same direction as the lead vehicle. With respect to vehicles having wheels, this may involve the remote vehicle rotating wheels of the remote vehicle in the opposite rotational direction as the lead vehicle.

In one embodiment, the vehicle consist may be a distributed power (DP) vehicle consist, with the orientations of the remote vehicles being designated as "short hood forward" (e.g., the remote vehicle is facing forward along a direction of travel) or "long hood forward" (e.g., the remote vehicle is facing rearward away from the direction of travel). In order to properly control the direction of the remote vehicles, direction control logic may need to be configured at control units of the remote vehicles to represent which direction the remote vehicles are facing relative to the lead vehicle. In one aspect, the direction of air flow in brake pipes of remote vehicles during initialization of the vehicles for DP operations may be monitored to automatically determine and set the orientation of the remote vehicles in the control units based on the direction of air flow. During an initial release of an air brake system prior to a brake pipe test (where flow of the air through the brake pipe extending through the vehicle consist is examined to ensure that the brake pipe is continuous along the length of the vehicle consist), the lead vehicle feeds air to the vehicle consist (and remote vehicles) via the brake pipe. The direction that the air flows along the brake pipe and through the vehicles in the vehicle consist comes from the direction of the lead vehicle. The remote vehicles can have a directional air flow sensor installed in the brake pipe to monitor the direction of air flow in the brake pipe. When the lead vehicle initiates the air brake release in preparation for the brake pipe test, the remote vehicles can monitor the direction of air flow in the brake pipe. The direction of air flow that is detected in the brake pipe can then be used to define the direction that the remote vehicle is facing. This direction may be used to automatically configure a control unit of the remote vehicle, which uses the direction to implement commands received from the lead vehicle, as described above.

In another aspect, the direction control logic may be configured to determining the orientation of a first vehicle (e.g., a first unmanned aerial vehicle, first drone, or the like) based on the direction a fluid flows within or through the first aerial vehicle, wherein the fluid is air moving within or through the first aerial vehicle. The air may be environmental air that is directed into the first aerial vehicle, may be exhaust air that is directed out of the first aerial vehicle, or the like. For example, the air may be directed into a propulsion system of the first aerial vehicle, may be exhaust directed out of the propulsion system of the first aerial vehicle, may be an alternative fluid that is directed into and/or out of the first aerial vehicle, or the like. The orientation may be the direction in which one part (e.g., a front end) of the vehicle is facing, regardless of the direction of travel of the vehicle. For example, a vehicle may have a forward orientation (e.g., a front end of the vehicle is facing a front direction) but the vehicle may move in a rearward direction (e.g., in a direction towards a rear end of the vehicle), therefore the orientation of the vehicle is separate from the direction of travel of the vehicle and the orientation is separate from the speed of fluid moving within or through the vehicle.

FIG. 1 is a schematic view of one embodiment of a vehicle consist 100. The illustrated vehicle consist 100 includes propulsion-generating vehicles 102, 104 and non-propulsion-generating vehicles 106 (e.g., vehicles 106A-D) mechanically coupled with each other. The propulsion-generating vehicles 102, 104 are capable of self-propulsion while the non-propulsion-generating vehicles 106 are not capable of self-propulsion. The propulsion-generating vehicles 102, 104 are shown as locomotives, the non-propulsion-generating vehicles 106 are shown as rail cars, and the vehicle consist 100 is shown as a train in the illustrated embodiment. Alternatively, the vehicles 102, 104 may represent other vehicles, such as automobiles, marine vessels, or the like, and the vehicle consist 100 can represent a grouping or coupling of these other vehicles. The number and arrangement of the vehicles 102, 104, 106 in the vehicle consist 100 are provided as one example and are not intended as limitations on all embodiments of the inventive subject matter described herein.

The vehicles 102, 104 can be arranged in a distributed power (DP) arrangement. For example, the vehicles 102, 104 can include a lead vehicle 102 that issues command messages to the other vehicles 104, which are referred to herein as remote vehicles. The designations "lead" and "remote" are not intended to denote spatial locations of the vehicles 102, 104 in the vehicle consist 100, but instead are used to indicate which vehicle 102, 104 is communicating (e.g., transmitting, broadcasting, or a combination of transmitting and broadcasting) operational command messages and which vehicles 102, 104 are being remotely controlled using the operational command messages. For example, the lead vehicle 102 may or may not be disposed at the front end of the vehicle consist 100 (e.g., along a direction of travel of the vehicle consist 100). Additionally, the remote vehicle 104 need not be separated from the lead vehicle 102. For example, the remote vehicle 104 may be directly coupled with the lead vehicle 102 or may be separated from the lead vehicle 102 by one or more other remote vehicles 104 and/or vehicles 106.

The operational command messages may include directives that direct operations of the remote vehicle 104. These directives can include propulsion commands that direct propulsion systems of the remote vehicle 104 to move in a designated location, at a designated speed, and/or power level, brake commands that direct the remote vehicles to apply brakes at a designated level, and/or other commands. The lead vehicle 102 issues the command messages to coordinate the tractive efforts and/or braking efforts provided by the vehicles 102, 104 in order to propel the vehicle consist 100 along a route 108, such as a track, road, waterway, or the like.

The vehicle consist 100 includes a fluid conduit 110 extending along a length of the vehicle consist 100. In one embodiment, the fluid conduit 110 extends through at least parts of the propulsion-generating vehicles 102, 104. The fluid conduit 110 can continuously extend through all of the propulsion-generating vehicles 102, 104 in the vehicle consist 100, or through less than all of the propulsion-generating vehicles 102, 104. The fluid conduit 110 can represent a brake pipe, such as an air brake pipe, or another conduit. For example, the fluid conduit 110 can hold air that is stored in the conduit 110 to prevent brake systems (described below) of the vehicles 102, 104 from engaging when the pressure of the air in the conduit 110 is sufficiently large. But, when the pressure in the conduit 110 falls below a designated threshold, the brake systems of the vehicles 102, 104 engage to slow or stop movement of the vehicle consist 100. The fluid (e.g., air or other fluid) may be added to the conduit 110 by a fluid source 112. The fluid source 112 may be a pump, reservoir, and/or the like, that supplies the fluid to the conduit 110. The fluid source 112 is shown as being disposed onboard the lead vehicle 102, but optionally may be disposed in another location of the vehicle consist 100.

During set up of the vehicles 102, 104 for operation as the vehicle consist 100, brake systems of the vehicle consist 100 may be tested by reducing the fluid pressure in the conduit 110 to see if the brake systems onboard the vehicles 102, 104 are engaged. The fluid source 112 may then be activated to at least partially fill the conduit 110 with fluid (e.g., air). As the conduit 110 is at least partially filled with fluid, the fluid may flow from the fluid source 112 along the length of the conduit 110.

The flow of this fluid in the conduit 110 may be sensed by one or more sensor assemblies 114 in one or more of the remote vehicles 104. The sensor assembly 114 can detect which direction the fluid is flowing in the conduit 110 within the remote vehicle 104. Based on this direction, the remote vehicle 104 can determine the orientation of the remote vehicle 104. For example, in the illustrated embodiment, the sensor assembly 114 can detect that the fluid is flowing in the conduit 110 in a direction 116 that points from a front end 118 of the remote vehicle 104 toward an opposite, back end 120 of the remote vehicle 104. A control unit (described below) of the remote vehicle 104 can determine, based at least in part on this detected fluid flow, that the front end 118 of the remote vehicle 104 is facing the lead vehicle 102 and/or that the back end 120 of the remote vehicle 104 is facing away from the lead vehicle 102. The control unit of the remote vehicle 104 may be programmed with the orientation of the lead vehicle 102 (e.g., which direction the front end and/or back end of the lead vehicle 102 is facing) so that the control unit can automatically determine the orientation of the remote vehicle 104 relative to the lead vehicle 102 based at least in part on the direction of fluid flow in the conduit 110. In the illustrated embodiment, the control unit can determine that the lead vehicle 102 and the remote vehicle 104 are facing the same direction.

Figure 2:
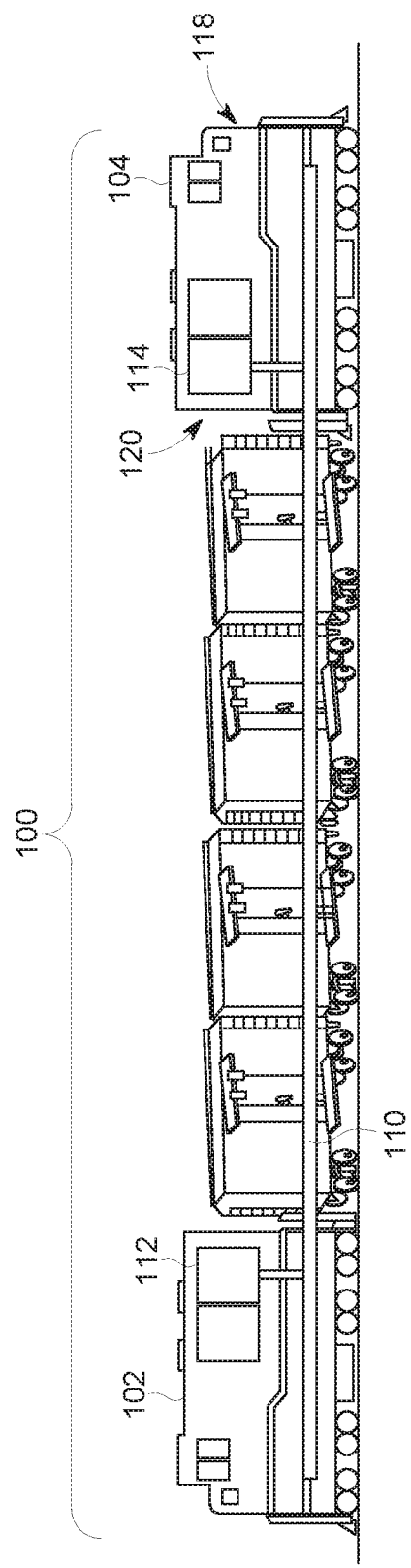
FIG. 2 is a schematic view of another embodiment of the vehicle consist shown in FIG. 1.

FIG. 2 is a schematic view of another embodiment of the vehicle consist 100. In contrast to the embodiment shown in FIG. 1, the vehicle consist 100 in FIG. 2 includes the remote vehicle 104 facing in an opposite direction (e.g., away from the lead vehicle 102). As the fluid source 112 at least partially fills the conduit 110 with fluid, the fluid may flow from the fluid source 112 along the length of the conduit 110 toward the remote vehicle 104.

The flow of the fluid in the conduit 110 is sensed by the sensor assembly 114 in the remote vehicle 104. Based on this direction, the remote vehicle 104 can determine the orientation of the remote vehicle 104. In the illustrated embodiment, the sensor assembly 114 can detect that the fluid is flowing in the conduit 110 in the direction 116 that now points from the back end 120 of the remote vehicle 104 toward the front end 118 of the remote vehicle 104. While the fluid may flow in the same direction as in the embodiment shown in FIG. 1, because the remote vehicle 104 is facing an opposite direction, the sensor assembly 114 can determine that the flow of the fluid in the conduit 110 is in an opposite direction in the remote vehicle 104 when compared to the orientation shown in FIG. 1. The control unit of the remote vehicle 104 may be programmed with the orientation of the lead vehicle 102 so that the control unit can automatically determine that the lead vehicle 102 and the remote vehicle 104 are facing opposite directions.

Figure 3:
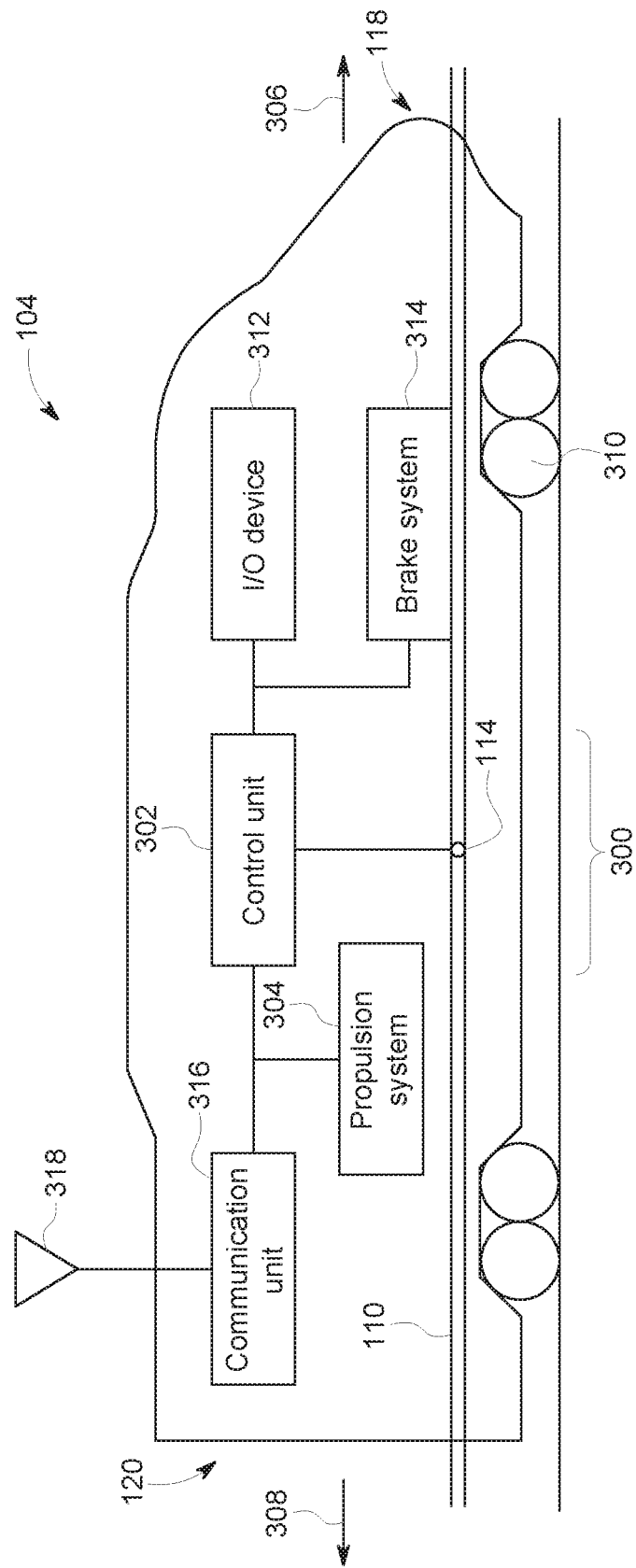
FIG. 3 is a schematic diagram of a remote vehicle shown in FIG. 1 in accordance with one embodiment.

FIG. 3 is a schematic diagram of the remote vehicle 104 shown in FIG. 1 in accordance with one embodiment. The vehicle 104 includes a monitoring system 300 that determines the orientation of the vehicle 104 relative to another vehicle 102 (shown in FIG. 1) in the same vehicle consist 100 (shown in FIG. 1) based at least in part on the direction of fluid flow in the fluid conduit 110 extending into and/or through the vehicle 104. The monitoring system 300 includes the sensor assembly 114 and a control unit 302. The control unit 302 can include or represent one or more hardware circuits or circuitry that include, are connected with, or that both include and are connected with one or more processors, controllers, or other hardware logic-based devices. The control unit 302 can be used to control movement of the vehicle 104, such as by receiving command signals from the lead vehicle 102 and determining how to control a propulsion system 304 to implement the command signals. For example, the control unit 302 can receive a command signal that instructs the control unit 302 to move the remote vehicle 104 in a first direction 306 or an opposite, second direction 308. The control unit 302 can refer to an orientation of the remote vehicle 104 that is determined based on the direction of fluid flow in the conduit 110 (as described above) and determine how to control the propulsion system 304 in order to implement the command signal (e.g., how to cause the remote vehicle 104 to move in the direction instructed by the command signal).

The propulsion system 304 includes one or more engines, alternators, generators, batteries, transformers, motors (e.g., traction motors), gears, transmissions, axles, or the like, that work to generate movement of the vehicle 104. The propulsion system 304 is controlled by the control unit 302 to move the vehicle 104. In the illustrated embodiment, the propulsion system 304 is operatively connected with wheels 310 of the vehicle 104 to rotate the wheels 310 and cause movement of the vehicle 104. Based on the command signal received at the remote vehicle 104 and the orientation of the vehicle 104, the control unit 302 can determine how to instruct the propulsion system 304 to move the vehicle 104. For example, if the command signal instructs the vehicle 104 to move in the direction 306, then the control unit 302 can refer to the orientation of the vehicle 104 that is determined from the fluid flow in the conduit 110 to determine if the front end 118 is facing toward or away from the direction 306 (and/or if the back end 120 is facing toward or away from the direction 306). In the illustrated embodiment, the control unit 302 can control the propulsion system 304 to rotate the wheels 310 in a clockwise direction to move the vehicle 104 in the direction 306. But, if the command signal instructs the vehicle 104 to move in the direction 308, then the control unit 302 can refer to the orientation of the vehicle 104 to rotate the wheels 310 in a counter-clockwise direction to move the vehicle 104 in the direction 308.

The sensor assembly 114 can represent one or more sensors that generate output (e.g., one or more data signals) that is communicated to the control unit 302 and that represents the direction in which fluid flows in the conduit 110. In one aspect, the sensor assembly 114 can represent one or more air flow meters, mass flow meters, or the like, that are disposed inside the conduit 110 to detect a direction of the flow of the fluid in the conduit 110. In another aspect, the sensor assembly 114 can represent two or more sensors that measure characteristics of the fluid flowing in the conduit 110 to determine the direction of fluid flow in the conduit 110. For example, the sensor assembly 114 can include two or more pressure transducers or other sensors that are sensitive to pressure in the conduit 110. These transducers can be spaced apart sufficiently far that, as the fluid flows into the conduit 110, a difference in pressure exists in the conduit 110 between the locations of the transducers. This pressure differential can be output by the sensor assembly 114 to the control unit 302, and the control unit 302 can examine the pressure differential to determine which direction the fluid is flowing in the conduit 110. For example, the measured pressure may be larger upstream of the direction of fluid flow in the conduit 110 than downstream of the direction of fluid flow.

In another embodiment, the sensor assembly 114 represents one or more sensors disposed on the outside (e.g., exterior surface) of the conduit 110. These sensors can monitor one or more characteristics of the conduit 110, and changes in the one or more characteristics can be examined by the control unit 302 to determine which direction the fluid is flowing in the conduit 110. In one aspect, the one or more characteristics can include strain of the conduit 110. The strain of the conduit 110 can increase as the fluid is filling the conduit 110. If the strain is larger in one section of the conduit 110 than another, then the location of the larger strain relative to the location of the smaller strain (e.g., as measured by different sensors, such as strain gauges) can indicate the direction in which the fluid is flowing (e.g., flowing from the location of larger strain to the location of smaller strain).

In another aspect, the one or more characteristics can include temperatures of the conduit 110. The temperature of the conduit 110 can change as the fluid is filling the conduit 110 and can be monitored by the sensor assembly 114 (which can include thermocouples or other temperature-sensitive devices). Changes in the temperature can be compared with directions in which the fluid is flowing in the conduit 110, and these changes and corresponding fluid flow directions can be stored in the control unit 302 (or a memory that is accessible to the control unit 302). The control unit 302 can monitor the temperature changes detected by the sensor assembly 114 and determine which direction the fluid is flowing in the conduit 110 from the temperature changes.

In another aspect, the one or more characteristics can include sounds of the conduit 110. The flow of fluid in the conduit 110 can generate audible sounds that are detected by the sensor assembly 114 (which can include microphones or other devices that are sensitive to sound). Sounds generated by the flow of fluid in the conduit 110 can be previously examined, and these sounds and corresponding fluid flow directions can be stored in the control unit 302 (or a memory that is accessible to the control unit 302). The control unit 302 can monitor the sounds detected by the sensor assembly 114 and determine which direction the fluid is flowing in the conduit 110 from the sounds.

The vehicle 104 also includes one or more input and/or output devices 312 ("I/O device" in FIG. 3). The control unit 302 can receive manual input from an operator of the vehicle 104 through the I/O device 312, which may include a touchscreen, keyboard, electronic mouse, microphone, or the like. For example, the control unit 302 can receive manually input changes to the tractive effort, braking effort, speed, power output, and the like, from the I/O device 312. The control unit 302 can present information to the operator using the I/O device 312, which can include a display screen (e.g., touchscreen or other screen), speakers, printer, or the like.

The control unit 302 can automatically input the orientation of the vehicle 104 relative to the lead vehicle 102 without operator intervention in one embodiment. For example, based on the direction of fluid flow in the conduit 110, the control unit 302 can determine the orientation of the vehicle 104 and use this orientation to determine how to implement command messages received from the lead vehicle 102 without operator intervention. Alternatively, the control unit 302 can determine the orientation of the vehicle 104 based on the direction of fluid flow and communicate the orientation to an onboard operator via the I/O device 312 and/or to an operator disposed onboard the lead vehicle 102 for confirmation of the orientation by the operator.

The control unit 302 is operatively connected with a brake system 314 of the vehicle 104. The brake system 314 can include and/or be fluidly coupled with the conduit 110. As described above, changes in the fluid pressure in the conduit 110 can engage or disengage the brake system 314. The control unit 302 also is operatively connected with a communication unit 316. The communication unit 316 includes or represents hardware and/or software that is used to communicate with other vehicles 102 in the vehicle consist 100. For example, the communication unit 316 may include an antenna 318, a transceiver, and/or associated circuitry for wirelessly communicating (e.g., communicating and/or receiving) command messages described above.

Figure 4:
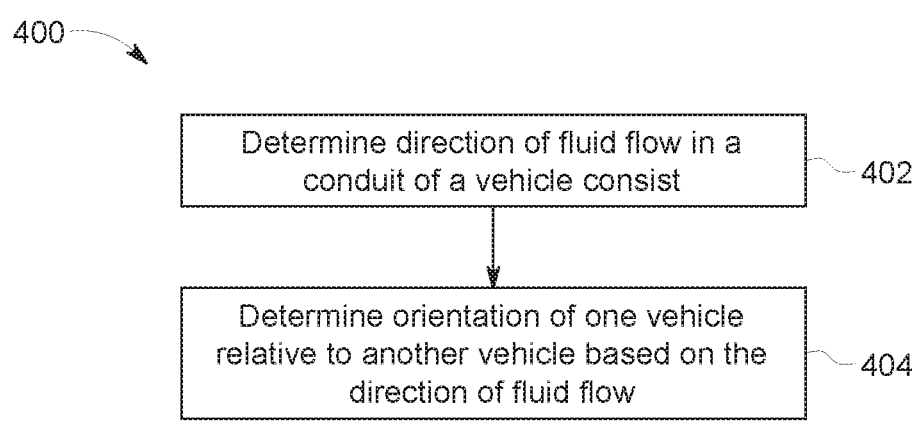
FIG. 4 illustrates a flowchart of a method for determining vehicle orientation according to one embodiment.

FIG. 4 illustrates a flowchart of a method 400 for determining vehicle orientation according to one embodiment. The method 400 can be performed by the monitoring system 300 shown in FIG. 3. At 402, a direction of fluid flowing in the conduit 110 (shown in FIG. 1) of the vehicle consist 100 (shown in FIG. 1) is determined. As described above, the direction of fluid flow can be measured in a location that is onboard the remote vehicle 104 (shown in FIG. 1). Optionally, the direction of the fluid flow can be determined before the vehicle consist 100 leaves to travel along the route 108 (shown in FIG. 1). For example, the direction of the fluid flow can be determined while the vehicle consist 100 is stationary. At 404, the orientation of the remote vehicle 104 relative to another vehicle (e.g., the lead vehicle 102) is determined based at least in part on the direction of fluid flow. For example, the orientation can be determined as facing the same or opposite direction as the lead vehicle 102.

As described above, this orientation can be used to determine how to implement command messages received by the lead vehicle 102 to prevent the remote vehicle 104 from working in an attempt to move the remote vehicle 104 in an opposite direction as the lead vehicle 102. Instead, the orientation can be used to ensure that the remote vehicle 104 works to move the remote vehicle 104 in the same direction as the lead vehicle 102. In one embodiment, the vehicles 102, 104 may be communicatively linked with each other to allow the lead vehicle 102 to remotely control movement of the remote vehicle 104. The vehicles 102, 104 may be communicatively linked with each other using the orientation that is determined. For example, the vehicle 104 may not accept command messages from the vehicle 102 until the orientation of the vehicle 104 is determined.

Figure 5:
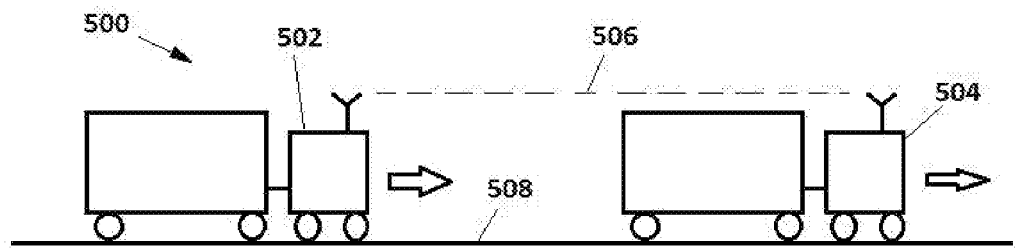
FIG. 5 and FIG. 6 are schematic views of other embodiments.
Figure 6:
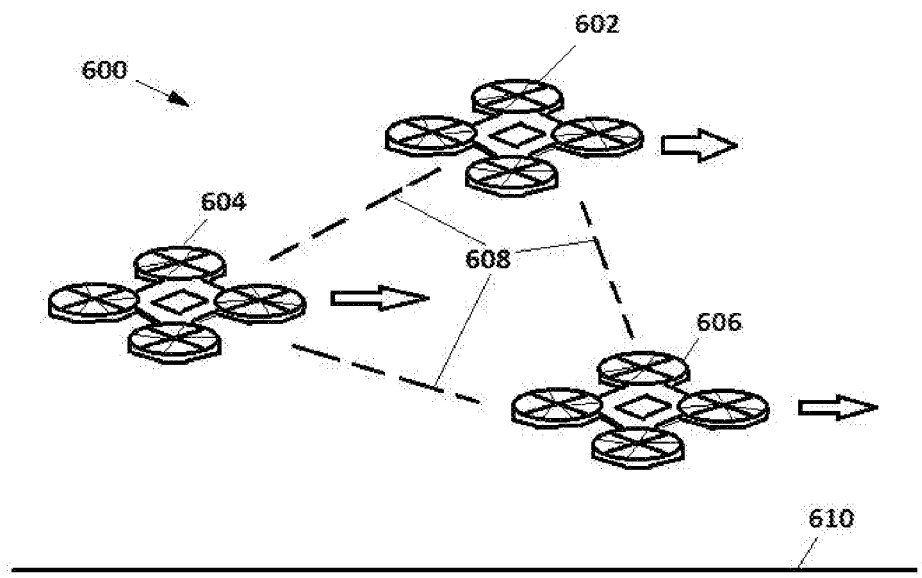

In embodiments, with reference to FIGS. 5 and 6, such as in regards to consists 500, 600 of aerial vehicles 602, 604, 606 or on-road vehicles 502, 504 (e.g., multiple automobiles or semi-trailer trucks), respectively, directions of fluid flow may be determined relative to a fluid conduit that is self-contained to an individual one or the vehicles. Examples of such conduits include air brake pipes or other brake pipes, fuel delivery lines, or conduits that are specially provided for purposes of detecting fluid flow direction. A respective direction of fluid flow is determined in each vehicle in a consist, and this information is used to determine orientation of the vehicles relative to one another. For example, fluid flow direction may correlate to vehicle heading/direction, and orientation can be determined based on two vehicles' headings/directions relative to one another. The vehicles in the consists may be configured for coordinated control, such as through wireless/RF links 506, 608 (e.g., implemented using RF transceivers and antennas); in embodiments, this includes one vehicle controlling other vehicles in the consist, and/or vehicles in the consist being configured to travel relative to a route 508, 610 based on how a designated or lead vehicle travels along the route.

In one embodiment, the sensor assembly may determine a direction in which fluid flows within or through the first aerial vehicle 602. The fluid may be environmental air that is directed into the first aerial vehicle, exhaust air that is directed out of the first aerial vehicle, or any combination therein. An orientation of the first aerial vehicle 602 relative to a second aerial vehicle 604 is determined based at least in part on the direction in which the fluid flows within or through the first aerial vehicle.

In one or more embodiments, the orientation is not just a vector based on speed and direction of the movement of air within or through the aerial vehicle. For example, the first aerial vehicle may have an orientation that is separate from the speed and/or direction of the movement of air within the aerial vehicle. The first aerial vehicle may have a front end that is facing a forward direction, such that the first aerial vehicle has a forward-facing orientation. However, the first aerial vehicle may move in a reverse direction, such that the first aerial vehicle has an orientation that is forward-facing, but the speed of the air moving through the first aerial vehicle and the direction of movement of air through or within the first aerial vehicle is in a different direction than the orientation of the first aerial vehicle. For example, the orientation of the first aerial vehicle is the direction in which one part (e.g., the front end) of the vehicle is facing, regardless of the direction of travel of the first aerial vehicle.

In one embodiment, a method (e.g., for determining an orientation of a vehicle) includes determining (with a sensor assembly disposed onboard a first vehicle that is included in a vehicle consist with a second vehicle) a direction in which a fluid flows within the first vehicle, and determining an orientation of the first vehicle relative to the second vehicle based at least in part on the direction in which the fluid flows within the first vehicle.

In one aspect, the fluid is in a brake system of the first vehicle.

In one aspect, determining the direction in which the fluid flows within the first vehicle occurs prior to the vehicle consist moving.

In one aspect, the orientation of the first vehicle represents whether the first vehicle and the second vehicle are facing a common direction or opposite directions.

In one aspect, the vehicle consist includes an air brake system that extends into the first vehicle and the second vehicle. Determining the direction in which the fluid flows can include determining the direction in which the fluid flows in the air brake system from the second vehicle to the first vehicle.

In one aspect, the method also includes communicatively linking the first vehicle with the second vehicle using the orientation that is determined so that the second vehicle can remotely control operation of the first vehicle.

In one aspect, determining the direction in which the fluid flows includes monitoring flow of the fluid using a sensor assembly that is disposed inside a brake pipe of the first vehicle.

In one aspect, determining the direction in which the fluid flows includes measuring one or more characteristics of a brake pipe of the first vehicle in a location that is external to the brake pipe and monitoring a change in the one or more characteristics of the brake pipe. The direction in which the fluid flows can be based at least in part on the change in the one or more characteristics of the brake pipe.

In one aspect, the one or more characteristics include at least one of strain, temperature, or sound.

In another embodiment, a system (e.g., a monitoring system) includes a sensor assembly and one or more processors. The sensor assembly is configured to generate an output representative of a direction in which a fluid flows within a first vehicle that is included in a vehicle consist with a second vehicle. The one or more processors are configured to determine an orientation of the first vehicle relative to the second vehicle based at least in part on the output generated by the sensor assembly.

In one aspect, the fluid is in a brake system of the first vehicle.

In one aspect, the one or more processors are configured to determine the direction in which the fluid flows within the first vehicle prior to the vehicle consist moving.

In one aspect, the one or more processors are configured to determine the orientation of the first vehicle as an indication of whether the first vehicle and the second vehicle are facing a common direction or opposite directions.

In one aspect, the vehicle consist includes an air brake system that extends into the first vehicle and the second vehicle. The one or more processors can be configured to determine the direction in which the fluid flows in the air brake system from the second vehicle to the first vehicle based on the output generated by the sensor assembly.

In one aspect, the one or more processors are configured to communicatively link the first vehicle with the second vehicle using the orientation that is determined so that the second vehicle can remotely control operation of the first vehicle.

In one aspect, the sensor assembly is configured to be disposed inside a brake pipe of the first vehicle and to generate the output based at least in part on the direction in which the fluid flows in the brake pipe.

In one aspect, the sensor assembly is configured to generate the output by measuring one or more characteristics of a brake pipe of the first vehicle in a location that is external to the brake pipe. The one or more processors can be configured to monitor the output generated by the sensor assembly for a change in the one or more characteristics of the brake pipe, wherein the one or more processors are configured to determine the direction in which the fluid flows based at least in part on the change in the one or more characteristics of the brake pipe.

In one aspect, the one or more characteristics include at least one of strain, temperature, or sound.

In another embodiment, another method (e.g., for determining an orientation of a vehicle) includes identifying a direction of air flow in an air brake pipe of a vehicle consist having a first vehicle and a second vehicle, and determining an orientation of the first vehicle relative to the second vehicle in the vehicle consist based at least in part on the direction of the air flow in the air brake pipe.

In one aspect, identifying the direction of air flow occurs onboard the first vehicle.

In another embodiment, a method comprises determining, with a sensor assembly disposed onboard a first vehicle that is included in a vehicle consist with a second vehicle, a direction in which a fluid flows within the first vehicle. The method further comprises determining an orientation of the first vehicle relative to the second vehicle based at least in part on the direction in which the fluid flows within the first vehicle. The first vehicle includes a first end, a distal second end, a first coupler located at the first end of the first vehicle and configured for selective coupling of the first vehicle to the second vehicle, and a second coupler located at the second end of the first vehicle and configured for selective coupling of the first vehicle to the second vehicle. (Selective coupling means the first and second ends of a vehicle are configured to be coupled to either of the first and second ends of another vehicle.) The second vehicle includes a first end, a distal second end, a third coupler located at the first end of the second vehicle and configured for selective coupling of the second vehicle to the first vehicle, and a fourth coupler located at the second end of the second vehicle and configured for selective coupling of the second vehicle to the first vehicle.

The vehicle consist is operational for movement along a common direction of a route (e.g., along rails if the vehicle consist is a train or other rail vehicle consist) both when the first end of the second vehicle is coupled to the second end of the first vehicle such that the first end of the first vehicle and the first end of the second vehicle are facing in the common direction, and when the second end of the second vehicle is coupled to the second end of the first vehicle such that the first end of the first vehicle is facing in the common direction and the first end of the second vehicle is facing opposite the common direction. The orientation of the first vehicle that is determined relative to the second vehicle is whether the first end of the first vehicle and the first end of the second vehicle are facing in the common direction or whether the first end of the first vehicle is facing in the common direction and the first end of the second vehicle is facing opposite the common direction. That is, in instances where the orientation is unknown (e.g., unknown to a processor-based system configured to carry out the method), it is determined that the first end of the first vehicle and the first end of the second vehicle are facing in the common direction, when in actuality they are facing in the common direction, and it is determined that the first end of the first vehicle is facing in the common direction and the first end of the second vehicle is facing opposite the common direction, when in actuality that is the case. The fluid may be a brake system fluid, and in embodiments, the orientation is determined when the vehicles are not moving, e.g., are not moving yet but a control sequence has been initiated for the vehicles to commence moving at a future point in time.

In one or more embodiments, an assignment system and method can determine time-varying risk profiles for each vehicle (e.g., aerial vehicles such as drones or other aircraft) of several vehicle systems traveling within a monitored transportation system. The monitored transportation system can be a portion or the entirety of a network of interconnected routes, such as interconnected roads, tracks, waterways, etc., that is monitored by sensors so that operators can remotely control movement of vehicle systems on the routes. The risk profiles can quantify the amount of risk involved in remotely controlling a vehicle. There can be greater risk (and, a larger numerical value assigned for the risk profile) in a vehicle carrying hazardous cargo, a vehicle traveling through a congested area, a vehicle traveling through hazardous weather conditions, or the like, relative to other vehicle systems. The risk may change with respect to time, so the risk profile of a vehicle can change with respect to time. The risk may be estimated based on forecasted or predicted conditions (e.g., weather conditions, traffic conditions, etc.).

The assignment system can communicate with the remote-control machines 106 and/or the vehicle systems via the network or networks. Alternatively, the assignment system can be formed as part of or shared with one or more of the remote-control machines. The assignment system operates to determine time-variable risk profiles for each of several separate vehicle systems. The time-variable risk profiles represent one or more risks to travel of the separate vehicle systems during trips of the separate vehicle systems that change with respect to time during the trip to the vehicle systems.

In one or more embodiments, one or more of the aerial vehicles of a vehicle consist may include an antenna that might be used, for example, for remote sensing with unmanned aerial vehicle technology. The antenna can include a radiating patch layer, an aperture layer, a first insulator layer sandwiched between the radiating patch layer and the aperture layer, a feed line, and a second insulator layer sandwiched between the feed line and the aperture layer. The aperture layer is made of a conductive material (e.g., metal), which defines an aperture. The antenna also includes a ground plane layer and a third insulator layer. The third insulator layer is sandwiched between the feed line and the ground plane layer. Like the first insulator layer, the third insulator layer also has a low dielectric constant, which may be the same as or different from the low dielectric constant of the first insulator layer (i.e., the first and third insulator materials may be the same material, or different materials that both have respective low dielectric constants). The antenna also includes a radome covering at least the radiating patch layer.

In one or more embodiments, the aerial vehicle can include video units for capturing and communicating video data in a transportation system or network. For example, the camera may be connected or otherwise disposed onboard an aerial device (e.g., a drone, helicopter, or airplane) to allow the camera unit to fly. The aerial device can fly above the route ahead of a non-aerial vehicle and communicate image data back to the non-aerial vehicle. The non-aerial vehicle includes a vehicle that is restricted to propelling itself along non-airborne routes, such as rail vehicles, other off-highway vehicles (e.g., mining vehicles or other ground-based vehicles that are not designed and/or not legally permitted to travel on public roadways), marine vessels, automobiles, or the like. This image data can include still images (e.g., snapshots), videos (e.g., data that shows movement), or a combination thereof. The image data can provide an operator of the non-aerial vehicle a view of the route well in advance of the arrival of the non-aerial vehicle. For very high speed non-aerial vehicles, the stopping distance may be beyond the visibility provided from the vantage of the non-aerial vehicle. The view from the aerial device, then, may extend or supplement that visible range. In addition, the camera itself may be repositionable and may have the ability to pan left, right, up and down, as well as the ability to zoom in and out.

In one or more embodiments, a camera may be connected or otherwise disposed onboard an aerial device (e.g., a drone, helicopter, or airplane) to allow the camera unit to fly, the camera unit may be connected with or otherwise disposed onboard another ground or aquatic mobile system (e.g., a robot or remote control vehicle) to allow the robot and camera to move relative to the vehicle, or the like. In one embodiment, the camera supporting object is a first ground vehicle capable of at least one of remote control or autonomous movement relative to a second ground vehicle along a route for the second vehicle. The first ground vehicle is intended to travel along the route ahead of the second vehicle and to transmit the image data back to the second ground vehicle. This may provide an operator of the second vehicle a view of the route well in advance of the arrival of the second vehicle. For very high speed second vehicles, the stopping distance may be beyond the visibility provided from the vantage of the second vehicle. The view from the first vehicle, then, may extend or supplement that visible range. In addition, the camera itself may be repositionable and may have the ability to pan left, right, up and down, as well as the ability to zoom in and out.

In another embodiment, the camera system can include a camera supporting object, such as a retractable mast, configured for attachment to the vehicle, such as the aerial vehicle. The retractable mast has one or more mast segments deployable from a first position relative to the vehicle to a second position relative to the vehicle, the second position being higher relative to the ground than the first position. The mast includes a coupler attached to at least one of the mast segments. The coupler allows for detachable coupling of the portable camera unit to at least one of the mast segments. When the portable camera unit is coupled to the retractable mast by way of the coupler and the retractable mast is deployed to the second position, the portable camera unit is positioned above the vehicle, for inspecting the roof of the vehicle, other vehicle units in a consist, the environs of the vehicle, or the like.

The camera system can also include control unit that, responsive to at least one of a location of the portable camera unit or a control input, controls at least one of the portable camera unit or the transportation system receiver to a first mode of operation for at least one of storing or displaying the video data on board the rail vehicle and to a second mode of operation for communicating the video data off board the rail vehicle for at least one of storage or display of the video data off board the rail vehicle. For example, the control unit may be configured to automatically control said at least one of the portable camera unit or the transportation system receiver from the first mode of operation to the second mode of operation responsive to the location of the portable camera unit being indicative of the rail vehicle being in a yard.

In one embodiment, a system (e.g., a camera system) includes a camera, at least one of a data storage device and/or a communication device, a camera supporting object, a locator device, and a control unit. The camera can be configured to capture at least image data. The data storage device can be electrically coupled to the camera and configured to store the image data. The communication device can be electrically coupled to the camera and configured to communicate the image data to a system receiver. The camera supporting object can be coupled to the camera. The locator device can be configured to detect a location of the camera supporting object. The control unit can be configured to communicate with the system receiver and the locator device, and to control the camera based at least in part on the location of the camera supporting object.

In one or more embodiments, an onboard system may be provided onboard the first and/or second aerial vehicle that is configured to control movement of the aerial vehicle a route relative to another aerial vehicle ahead along the same route that is moving in the same direction. For example, the onboard system paces the vehicle system based on an acceleration capability of the vehicle ahead such that the vehicle system does not travel within a designated range of the vehicle ahead, which would require the vehicle system to stop or at least slow to increase the distance between the vehicles. Such pacing increases the overall throughput and efficiency by avoiding delays that occur as a result of the trailing vehicle system traveling too closely to the vehicle ahead, which mandates that the trailing vehicle system slow to a stop or a low non-zero speed for a period of time before being allowed to accelerate up to a desired speed again. The stops and/or reduced speeds of the trailing vehicle system increase the travel time of the trailing vehicle system along the route and decrease the travel efficiency (e.g., increased fuel consumption, increased noise and exhaust emissions, etc.).

In one or more embodiments, a trip planning controller is configured to set or designate a permitted power output per weight (PO/W) limit for a trailing vehicle system (e.g., a second aerial vehicle, second aerial drone, or the like) that is less than the maximum achievable power output per weight (that is achievable based at least in part on the hardware of the vehicle system). The trailing vehicle system crosses a proximity threshold when the trailing distance is less than the first proximity distance relative to the leading vehicle system (e.g., a first aerial vehicle, a first aerial drone). Thus, if the maximum achievable power output of the trailing vehicle system is 12,000 horsepower, the permitted power output per weight limit may restrict the trailing vehicle system to generate no more than 8,000 horsepower. The permitted power output per weight limit may be enforced or implemented by limiting the throttle settings used to control the movement of the vehicle system along the route. For example, because the top throttle setting is associated with the maximum achievable power output, the permitted power output per weight limit may restrict (e.g., prevent) the use of at least the top throttle setting, and potentially multiple throttle settings at the top range of the available throttle settings.

In one or more embodiments, a permitted PO/W limit is set for the segment of the route based, at least in part, on the maximum achievable PO/W of one or more of the aerial vehicle systems scheduled to travel on the segment of the route. The permitted PO/W limit is less than the maximum achievable PO/W of at least some of the aerial vehicle systems. Optionally, setting the permitted PO/W limit may include ranking the maximum achievable PO/W of the aerial vehicle systems in order from lowest to highest in a distribution, and using the particular maximum achievable PO/W in the distribution that is closest to a pre-selected percentile as the permitted PO/W limit. Optionally, setting the permitted PO/W limit may include determining the lowest maximum achievable PO/W out of the vehicle systems scheduled to travel along the segment of the route in a common direction of travel during the predetermined time period, and using that lowest maximum achievable PO/W as the permitted PO/W limit. Optionally, setting the permitted PO/W limit may include calculating an average or median of the maximum achievable PO/W of each of the aerial vehicle systems scheduled to travel along the segment of the route during the predetermined time period.

In another embodiment, each of first and second aerial vehicle systems may travel along different segments of a route at different power outputs depending on route characteristics and other factors, such that the vehicle systems may often provide a current power output that is less than the respective upper power output limit. For example, the trailing vehicle system (e.g., a second aerial vehicle) may have an upper power output limit of 12,000 horsepower, but generates less than 12,000 horsepower along various segments of the route according to the trip plan. The trip plan designates throttle and brake settings of the vehicle system during the trip based on time or location along the route. The throttle settings may be notch settings. In one embodiment, the throttle settings include eight notch settings, where Notch 1 is the low throttle setting and Notch 8 is the top throttle setting. Notch 8 corresponds to the upper power output limit, which is 12,000 horsepower in one embodiment. Thus, when the vehicle system 200 operates at Notch 8, the vehicle system provides a power output at the upper power output limit (which is associated with the HPT of the vehicle system 200). During a trip, the trip plan may designate the vehicle system to travel at Notch 5 along a first segment of the route, at Notch 7 along a second segment of the route, and at Notch 8 along a third segment of the route. As such, the vehicle system is controlled to generate a power output that varies over time and/or distance along the route. The generated power output may be equal to the upper power output limit at some locations (e.g., along the third segment of the route) and lower than the upper power output limit at other locations (e.g., along the first and second segments).

In an embodiment, first and second robotic machines, such as first and second aerial robotic machines, may coordinate performance of respective sequences of sub-tasks to accomplish an assigned task. Thus, the performance of the first sequence of sub-tasks by the first robotic machine may be coordinated with the performance of the second sequence of sub-tasks by the second robotic machine. In an embodiment, the first and second robotic machines coordinate by communicating directly with each other during the performances of the sub-tasks. The first robotic machine provides a status notification to the second robotic machine. The status notification may be a message communicated wirelessly as electromagnetic RF signals from the communication circuit of the first robotic machine to the communication circuit of the second robotic machine. The second robotic machine receives the status notification. The status notification may inform the second robotic machine that the first robotic machine has started or completed a specific sub-task in the first sequence. The second robotic machine processes the received status notification and may use the status notification to determine when to start performing certain sub-tasks in the second sequence. For example, at least some of the sub-tasks in the first and second sequences may be sequential, such that the second robotic machine may begin performance of a corresponding sub-task in the second sequence responsive to receiving the notification from the first robotic machine that the first robotic machine has completed a specific sub-task in the first sequence. Other sub-tasks in the first and second sequences may be performed concurrently by the first and second robotic machines, such that the time period that the first robotic machine performs a given sub-task in the first sequence at least partially overlaps the time period that the second robotic machine performs a given sub-task in the second sequence. For example, both robotic machines may concurrently move towards the equipment. In another example, the first robotic machine may extend a robotic arm towards the target object of the equipment concurrently with the second robotic machine lifting the first robotic machine. Coordinated and concurrent actions by the robotic machines may enhance the efficiency of the performance of the assigned task on the equipment.

In one or more embodiments, robotic machines, such as first and second aerial drones or vehicles, may be configured to perform additional or different tasks other than brake bleeding. For example, the robotic machines may be assigned the task of setting and/or releasing the hand brakes of one or both vehicles. The hand brakes may be set as a back-up to the air brakes. When the vehicle system is stopped, human operators may decide to set the hand brakes on only some of the vehicles, such as the hand brakes on every fourth vehicle along the length of the vehicle system. One assigned task may be to release the hand brakes on the vehicles to allow the vehicle system to move along the route. In an embodiment, the aerial robotic machine may fly along the vehicle system to detect which vehicles have hand brakes that need to be released. The aerial robotic machine may inspect the hand brakes along the vehicles and/or the positions of the brake wheels to determine which vehicles need to have the hand brakes released. For example, the aerial robotic machine may determine that the hand brakes of the second vehicle 54 need to be released, but the hand brakes 124 of the first vehicle are not set. The aerial robotic machine notifies the grasping robotic machine to actuate the brake wheel of the second vehicle, but not the brake wheel of the first vehicle. The aerial robotic machine may also provide other information to a grasping robotic machine, such as the type and location of obstacles detected in the path of the grasping robotic machine.

In another embodiment, a system for in-motion modification of an autonomously-operated inspection platform (AIP) motion plan can include an AIP having a control processor in communication with a motion control subsystem, a data collection subsystem, an analytic subsystem, and a memory unit that includes executable instructions that cause the control processor to perform a method. The AIP may be a robot, an unmanned aerial vehicle, a drone, or the like, capable to perform in-motion adaptation to modify its data collection motion plan. The method can include receiving an initial motion plan including a series of waypoints defining an initial path, autonomously controlling movement of the AIP along the initial path, obtaining sensor data for areas of interest of an industrial asset, analyzing the sensor data and determining if the initial motion plans requires additional waypoints.

In one or more embodiments, an asset inspection system can include robots, such as unmanned aerial vehicles or drones, that collect inspection data related to an asset. A data streaming server receives inspection data from the robots and transmits subscriber-specific inspection data to a subscriber. The data streaming server dispatches an incoming inspection data feed to plural channels, synchronizes the dispatch of the incoming inspection data feed based on distribution streams, processes the channels to generate the distribution streams, and distributes the distribution streams to the respective subscribers.

In another embodiment, an asset inspection system can include a robot, such as an unmanned aerial vehicle or a drone, and a server that can receive a request for data including an algorithm from the robot, locate requested data in a database, encrypt the requested data, and transmit the requested data to the robot. The robot collects inspection data corresponding to an asset based on the requested data and transmits the collected inspection data to the server.

In one or more embodiments, a computing system can include a storage to store regions of interest with respect to a virtual asset displayed in virtual space and three-dimensional positions of each region of interest. A processor generates a travel path for an unmanned robot, such as an unmanned aerial vehicle or a drone, about a physical asset corresponding to the virtual asset, and generates a virtual 3D travel path with respect to the virtual asset based on the 3D positions of the regions of interest. An output outputs a robotic inspection plan that includes the generated physical travel path about the physical asset for the unmanned robot, aerial vehicle, drone, or the like.

In one or more embodiments, a robotic system, such as an unmanned aerial vehicle or drone system, can include a storage that stores a three-dimensional model of a travel path with respect to a virtual asset that is created in virtual space. A processor can convert the virtually created 3D model of the travel path into a physical travel path about a physical asset, autonomously control the vertical and/or lateral movement of the unmanned robot (e.g., aerial vehicle or drone) in three dimensions with respect to the physical asset based on the physical travel path, and capture data at different regions of interest. The storage stores information concerning the captured data about the asset.

In another embodiment, a robotic system, such as an unmanned aerial vehicle system or drone system that includes a drone, can monitor an asset. A robot, such as an aerial vehicle or a drone, can include a sensor that detects characteristics of an asset and include an effector capable of performing a repair or maintenance operation on the asset. A processing system receives sensor data indicating a characteristic of the asset from the sensor of the robot, detects an existing or imminent defect of the asset, and performs a corrective action that corrects the defect.

In one or more embodiments a robot system can monitor the health of an asset. The system may include a robot, such as an unmanned aerial vehicle or a drone, that includes a sensor for detecting characteristics of the asset and an effector that performs a repair or maintenance operation on the asset. A processing system receives sensor data from the sensor indicating a characteristic of the asset; generates, updates, or maintains a digital representation that models the characteristics of the asset; detects a defect of the asset based on the characteristic; and generates an output signal conveying instructions to provide a recommendation to an operator, to control the robot or drone to address the defect on the asset, or both, based on the defect and the digital representation of the asset.

In another embodiment, a robotic system can monitor an asset. The system can include a robot, such as an unmanned aerial vehicle or a drone, having a sensor that detects characteristics of an asset and an effector that performs repairs or maintenance on the asset. A processor system generates a plan to monitor the asset that includes tasks to be performed by the robot, receives sensor data from the sensor indicating the characteristic of the asset, and adjusts the plan to monitor the asset by adjusting or adding tasks to the plan based on the quality of the acquired data and/or a potential defect of the asset. The adjusted plan can cause the robot to acquire additional data related to the asset.

In one or more embodiments, a drone may include an inspection system having the primary purpose of inspecting a route. Where the route parameters are collected by a drone, the drone can obtain images of the route using one or more of visible light video, infrared, Light Detection and Ranging (Lidar), ultrasound, and radar. Suitable drones can include an aerial drone or a surface vehicle. If the drone is a surface vehicle drone it may be autonomous or semi-autonomous as it travels over the segment of the route. Other suitable surface drones may be remotely piloted. A combination of discrete information sources (geographically discrete and temporally discrete) with continuous monitoring by an on-board rail health monitor, an off-board rail health monitor, an aerial vehicle such as a drone, and/or broken rail detector allows for the controller in the locomotive to provide real time control over the speed and operation of the train. In one embodiment, information from a wayside detector can inform a locomotive that there is a problem or potential problem with a wheel and/or combo. The locomotive may then switch operating modes based on that information. One potential operating mode involves slowing or stopping the train. Another potential operating mode involves monitoring the train set for indications that the wheel and/or combo are exhibiting the problem. For example, if a wayside detector indicates that there is a hot axle, the locomotive can monitor the train for increased drag. If an axle seizes up, the increased resistance (or increased coupler force if there is a coupler sensor) can be detected as increased drag and an on-board the rail car sensor can alert the locomotive controller. The controller can then implement a determined action in response to detecting the increased drag.

In one or more embodiments, a sensor package (e.g., a video/IR camera, microphone, accelerometer, radiation detector, LIDAR), for capturing and communicating data, may be connected or otherwise disposed onboard a mobile platform (e.g., a driverless or remotely controlled automobile, drone, marine vessel, helicopter, or airplane) to allow the sensor package unit to move. The transportation system or network can include interconnected routes (e.g., tracks, roads, waterways, or other paths), wayside devices, and/or other components, such as bridges, tunnels, gates, etc. An aerial unmanned vehicle (also referred to as a drone) may be used as an example of the mobile platform, which, in this example, may have a video camera supported on the drone. The drone can move along a route ahead of a non-aerial transport vehicle and can communicate image data back to the non-aerial vehicle. Suitable examples of non-aerial vehicles include a vehicle that is restricted to propelling itself along non-airborne routes, such as rail vehicles, other off-highway vehicles (e.g., mining vehicles or other ground-based vehicles that are not designed and/or not normally permitted to travel on public roadways), marine vessels, agricultural equipment, automobiles, and the like.

In another embodiment, a system includes route examination equipment and a controller. The route examination equipment can obtain a route parameter indicative of a condition of a route over which a vehicle system travels. The controller receives the route parameter, and examines the route parameter to determine the condition of the route. The controller controls at least one operational aspect of the vehicle system in response to the determined condition of the route. The route examination equipment can include one or both of a stationary wayside unit and a mobile route inspection unit. Suitable stationary wayside units may include one or more of a video (visible light) sensor unit, an infrared sensor unit, and an electrical current sensor. The electrical current sensor can determine if an electrical break or an electrical short has occurred in a monitored segment of the route. Suitable mobile route inspection units may include one or more of a drone or unmanned vehicle, an inspection system secured to the vehicle system at it travels over a segment of the route, or an inspection system mounted on an inspection vehicle having the primary purpose of inspecting the route. A primarily purposed inspection vehicle may include a Hi-Rail vehicle (with respect to rail usage) having gel-filled ultrasound wheels. A mounted inspection system may be secured to (again, with reference to rail usage) the locomotive and/or one or more of the rail cars. For on-road vehicles, the mounted inspection system can be secured to automobiles, tractor-trailers, busses, and the like.

In one or more embodiments, the controller is configured to obtain one or more of a route parameter or a vehicle parameter from discrete examinations of one or more of a route or a vehicle system. The route parameter is indicative of a health of the route over which the vehicle system travels. The vehicle parameter is indicative of a health of the vehicle system. The discrete examinations of the one or more of the route or the vehicle system are separated from each other by one or more of location or time. The controller is configured to examine the one or more of the route parameter or the vehicle parameter to determine whether the one or more of the route or the vehicle system is damaged. The examination equipment is configured to continually monitor the one or more of the route or the vehicle system responsive to determining that the one or more of the route or the vehicle is damaged. The system can complement, correlate with, and/or fill in monitoring or examination gaps of the discrete examinations collected by the controller.

In one or more embodiments, where the route parameters are collected by a drone, the drone can obtain images of the route using one or more of visible light video, infrared, Light Detection and Ranging (Lidar), ultrasound, and radar. Suitable drones can include an aerial drone or a surface vehicle. If the drone is a surface vehicle drone it may be autonomous or semi-autonomous as it travels over the segment of the route. Other suitable surface drones may be remotely piloted.

In one or more embodiments, a camera may be disposed on an off-board device, such as an aerial vehicle, that is remotely located from a non-aerial vehicle as the non-aerial vehicle moves along a route. The camera generates image data representative of an upcoming segment of the route relative to a direction of travel of the non-aerial vehicle. The off-board device wirelessly communicates image data to the non-aerial vehicle during movement of the non-aerial vehicle along the route.

In another embodiment, a system (e.g., a communication system) includes a control unit and a remote communication unit. The control unit can be configured to be disposed onboard a remote vehicle in a vehicle consist having a first lead vehicle and at least the remote vehicle. The first lead vehicle and/or the remote vehicle may be aerial vehicles, such as drones. The control unit also can be configured to obtain a lead vehicle identifier representative of the first lead vehicle. The remote communication unit can be configured to be disposed onboard the remote vehicle and to receive a link command message that includes identifying information representative of a designated lead vehicle. The control unit can be configured to compare the identifying information of the link command message with the lead vehicle identifier and to establish a communication link between the first lead vehicle and the remote vehicle responsive to the identifying information of the link command message matching the lead vehicle identifier.

In one or more embodiments of the subject matter described herein, a method includes determining, with a sensor assembly disposed onboard a first aerial vehicle, a direction in which a fluid flows within or through the first aerial vehicle, and determining an orientation of the first aerial vehicle relative to a second aerial vehicle based at least in part on the direction in which the fluid flows within or through the first aerial vehicle.

Optionally, the fluid is air that moves within the first aerial vehicle.

Optionally, the air is one or more of environmental air that is directed into the first aerial vehicle or exhaust air that is directed out of the first aerial vehicle.

Optionally, determining the direction in which the fluid flows within the first aerial vehicle occurs when the first aerial vehicle is moving.

Optionally, the orientation of the first aerial vehicle represents whether the first aerial vehicle and the second aerial vehicle are facing a common direction or different directions.

Optionally, the method also includes communicatively linking the first aerial vehicle with the second aerial vehicle using the orientation that is determined so that one of the first aerial vehicle or the second aerial vehicle can remotely control operation of the other of the first aerial vehicle or the second aerial vehicle.

Optionally, determining the direction in which the fluid flows includes monitoring flow of the fluid using a sensor of the sensor assembly that is disposed onboard the first aerial vehicle.

Optionally, determining the direction in which the fluid flows includes measuring one or more characteristics of a propulsion system of the first aerial vehicle in a location that is external to a brake pipe and monitoring a change in the one or more characteristics of the propulsion system of the first aerial vehicle. The direction in which the fluid flows is based at least in part on the change in the one or more characteristics of the propulsion system of the first aerial vehicle.

Optionally, the one or more characteristics include at least one of strain, temperature, or sound.

In one or more embodiments of the subject matter described herein, a system includes a sensor assembly that generates an output representative of a direction in which a fluid flows within or through a first aerial vehicle that is included in a vehicle consist with a second aerial vehicle. One or more processors determine an orientation of the first aerial vehicle relative to the second aerial vehicle based at least in part on the output generated by the sensor assembly.

Optionally, the fluid is air that moves within the first aerial vehicle.

Optionally, the air is one or more of environmental air that is directed into the first aerial vehicle or exhaust air that is directed out of the first aerial vehicle.

Optionally, the one or more processors determine the direction in which the fluid flows within the first aerial vehicle when the first aerial vehicle is moving.

Optionally, the one or more processors determine the orientation of the first aerial vehicle as an indication of whether the first aerial vehicle and the second aerial vehicle are facing a common direction or different directions.

Optionally, the one or more processors are configured to communicatively link the first aerial vehicle with the second aerial vehicle using the orientation that is determined so that one of the first aerial vehicle or the second aerial vehicle can remotely control operation of the other of the first aerial vehicle or the second aerial vehicle.

Optionally, the sensor assembly is configured to be disposed inside of the first aerial vehicle and generate the output based at least in part on the direction in which the fluid flows in the system.

Optionally, the sensor assembly generates the output by measuring one or more characteristics of a propulsion system of the first aerial vehicle in a location that is external to the propulsion system. The one or more processors monitor the output generated by the sensor assembly for a change in the one or more characteristics of the propulsion system. The one or more processors determine the direction in which the fluid flows based at least in part on the change in the one or more characteristics of the propulsion system.

Optionally, the one or more characteristics include at least one of strain, temperature, or sound.

In one or more embodiments of the subject matter described herein, a method includes identifying a direction of air flow in a propulsion system of a first aerial vehicle of a vehicle consist having the first aerial vehicle and a second aerial vehicle, and determining an orientation of the first aerial vehicle relative to the second aerial vehicle in the vehicle consist based at least in part on the direction of the air flow in the propulsion system of the first aerial vehicle. The air is one or more of environmental air that is directed into the propulsion system of the first aerial vehicle or exhaust air that is directed out of the propulsion system of the first aerial vehicle.

Optionally, identifying the direction of air flow occurs onboard the first aerial vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose message processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

The invention claimed is:

1. A method comprising:
   determining, with a sensor assembly disposed onboard a first aerial vehicle, a direction in which a fluid flows within or through the first aerial vehicle;
   determining an orientation of the first aerial vehicle relative to a second aerial vehicle based at least in part on the direction in which the fluid flows within or through the first aerial vehicle; and
   changing movement of one or more of the first aerial vehicle or second aerial vehicle based on the direction in which the fluid flows within or through the first aerial vehicle and the orientation of the first aerial vehicle.

2. The method of claim 1, wherein the fluid is air that moves within the first aerial vehicle.

3. The method of claim 2, wherein the air is one or more of environmental air that is directed into the first aerial vehicle or exhaust air that is directed out of the first aerial vehicle.

4. The method of claim 1, wherein determining the direction in which the fluid flows within the first aerial vehicle occurs when the first aerial vehicle is moving.

5. The method of claim 1, wherein the orientation of the first aerial vehicle represents whether the first aerial vehicle and the second aerial vehicle are facing a common direction or different directions.

6. The method of claim 1, further comprising communicatively linking the first aerial vehicle with the second aerial vehicle using the orientation that is determined so that one of the first aerial vehicle or the second aerial vehicle can remotely control operation of the other of the first aerial vehicle or the second aerial vehicle.

7. The method of claim 1, wherein determining the direction in which the fluid flows includes monitoring flow of the fluid using a sensor of the sensor assembly that is disposed onboard the first aerial vehicle.

8. The method of claim 1, wherein determining the direction in which the fluid flows includes measuring one or more characteristics of a propulsion system of the first aerial vehicle in a location that is external to a brake pipe and monitoring a change in the one or more characteristics of the propulsion system of the first aerial vehicle, wherein the direction in which the fluid flows is based at least in part on the change in the one or more characteristics of the propulsion system of the first aerial vehicle.

9. The method of claim 8, wherein the one or more characteristics include at least one of strain, temperature, or sound.

10. A system comprising:
   a sensor assembly configured to generate an output representative of a direction in which a fluid flows within or through a first aerial vehicle that is included in a vehicle consist with a second aerial vehicle; and
   one or more processors configured to determine an orientation of the first aerial vehicle relative to the second aerial vehicle based at least in part on the output generated by the sensor assembly,
   wherein the one or more processors are configured to change movement of the second aerial vehicle based on the direction in which the fluid flows within or through the first aerial vehicle and the orientation of the first aerial vehicle.

11. The system of claim 10, wherein the fluid is air that moves within the first aerial vehicle.

12. The system of claim 11, wherein the air is one or more of environmental air that is directed into the first aerial vehicle or exhaust air that is directed out of the first aerial vehicle.

13. The system of claim 10, wherein the one or more processors are configured to determine the direction in which the fluid flows within the first aerial vehicle when the first aerial vehicle is moving.

14. The system of claim 10, wherein the one or more processors are configured to determine the orientation of the first aerial vehicle as an indication of whether the first aerial vehicle and the second aerial vehicle are facing a common direction or different directions.

15. The system of claim 10, wherein the one or more processors are configured to communicatively link the first aerial vehicle with the second aerial vehicle using the orientation that is determined so that one of the first aerial vehicle or the second aerial vehicle can remotely control operation of the other of the first aerial vehicle or the second aerial vehicle.

16. The system of claim 10, wherein the sensor assembly is configured to be disposed inside of the first aerial vehicle and to generate the output based at least in part on the direction in which the fluid flows in the system.

17. The system of claim 10, wherein the sensor assembly is configured to generate the output by measuring one or more characteristics of a propulsion system of the first aerial vehicle in a location that is external to the propulsion system, and wherein the one or more processors are configured to monitor the output generated by the sensor assembly for a change in the one or more characteristics of the propulsion system, wherein the one or more processors are configured to determine the direction in which the fluid flows based at least in part on the change in the one or more characteristics of the propulsion system.

18. The system of claim 17, wherein the one or more characteristics include at least one of strain, temperature, or sound.

19. The system of claim 10, wherein the first aerial vehicle is configured to fly above a route, the system further comprising a camera unit disposed onboard the first aerial vehicle and configured to generate image data during flight of the first aerial vehicle; and a communication unit disposed onboard the first aerial vehicle, the communication unit comprising an antenna and a transmitter, wherein the communication unit configured to wirelessly communicate the image data to a location offboard the first aerial vehicle, the antenna comprising:

a radiating patch layer;

an aperture layer, wherein the aperture layer is conductive and defines an aperture;

a first insulator layer sandwiched between the radiating patch layer and the aperture layer, wherein the radiating patch layer and the aperture layer are spaced apart from one another by at least a thickness of the first insulator layer, and wherein the first insulator layer has a low dielectric constant, a conductive feed line;

a second insulator layer sandwiched between the aperture layer and the feed line;

a ground plane layer;

a third insulator layer sandwiched between the feed line and the ground plane layer, wherein the third insulator layer has a low dielectric constant; and a radome covering at least the radiating patch layer, wherein the radiating patch layer, the first insulator layer, the aperture layer, the second insulator layer, the conductive feed line, the third insulator layer, and the ground plane layer are all parallel to and stacked on top of one another.

20. The system of claim 10, further comprising:

a camera configured to capture at least image data;

at least one of a data storage device electrically coupled to the camera and configured to store the image data, or a communication device electrically coupled to the camera and configured to communicate the image data to a system receiver;

a camera supporting object coupled to the camera; and a control unit configured to communicate with the system receiver, and to control the camera based at least in part on the location of the camera supporting object, wherein the camera supporting object is the first aerial device configured for at least one of remote control or autonomous flying relative to a ground vehicle route for a vehicle.

21. A method comprising:

identifying a direction of air flow in a propulsion system of a first aerial vehicle of a vehicle consist having the first aerial vehicle and a second aerial vehicle;

determining an orientation of the first aerial vehicle relative to an orientation of the second aerial vehicle in the vehicle consist based at least in part on the direction of the air flow in the propulsion system of the first aerial vehicle, wherein the air is one or more of environmental air that is directed into the propulsion system of the first aerial vehicle or exhaust air that is directed out of the propulsion system of the first aerial vehicle;

communicatively linking the first aerial vehicle with the second aerial vehicle using the orientation of the first aerial vehicle that is determined; and changing movement of one of the first aerial vehicle or the second aerial vehicle by the other of the first aerial vehicle or the second aerial vehicle remotely controlling operation of the other of the first aerial vehicle or the second aerial vehicle.

* * * * *